(12) United States Patent
Sato et al.

(10) Patent No.: US 6,229,631 B1
(45) Date of Patent: May 8, 2001

(54) SIGNAL TRANSMISSION SYSTEM AND METHOD FOR SUPERVISING THE SAME

(75) Inventors: Hideaki Sato; Issei Asabayashi; Hidenari Maeda; Takashi Watanabe, all of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/065,484

(22) Filed: Apr. 24, 1998

(30) Foreign Application Priority Data

Apr. 25, 1997 (JP) .................................................. 9-109248
Jan. 30, 1998 (JP) .................................................. 10-019222

(51) Int. Cl.[7] ................................................. H04B 10/08
(52) U.S. Cl. ......................... 359/110; 359/177; 359/179
(58) Field of Search .................................... 359/110, 161, 359/173, 179, 177

(56) References Cited

U.S. PATENT DOCUMENTS

| | | | |
|---|---|---|---|
| 5,173,896 | * 12/1992 | Dariano | 370/249 |
| 5,367,394 | * 11/1994 | Chuter et al. | 359/110 |
| 5,969,840 | * 10/1999 | Roberts | 359/179 |

* cited by examiner

Primary Examiner—Kinfe-Michael Negash
(74) Attorney, Agent, or Firm—Wenderoth, Lind & Ponack, LLP

(57) ABSTRACT

A signal transmission system includes an interface unit that monitors the operating condition of each device. The signal transmission system also includes a simulator that simulates the transmission quality of the system in response to the operating condition of each device, and controls each device so as to optimize the transmission quality.

31 Claims, 32 Drawing Sheets

FIG. 9

| | Single Channel Calculation | WDM Calculation |
|---|---|---|
| Applications | • 1 channel transmission<br>• sparse WDM transmission<br>(calculate each channel separately) | • dense WDM transmission |
| Considered Effects | GVD, SPM, ASE-buildup | GVD, SPM, XPM, FWM, ASE-buildup |
| Assumptions & Conditions | (10 Gbit/s transmission)<br>• polarization    scalar<br>• bit number    $2^8$<br>• time resolution    0.4 ps<br>$\left(\begin{array}{l}\text{resolution} = 40 \text{ MHz}\\ \text{bandwidth} = 2.5 \text{ THz or } 20 \text{ nm}\end{array}\right)$<br>• 1 step distance    ~1 km | (10 Gbit/s transmission)<br>• polarization    scalar<br>• bit number    $2^{10}$<br>• time resolution    0.1 ps<br>$\left(\begin{array}{l}\text{resolution} = 10 \text{ MHz}\\ \text{bandwidth} = 10 \text{ THz or } 80 \text{ nm}\end{array}\right)$<br>• 1 step distance    < 0.05 km |
| Calculation Time SUN Ultra I model 170 | 1.5 min for 100km transmission | 2.5 days for 100km transmission<br>(1 step distance = 0.01 km) |

SUPERVISORY SIGNAL

---------> UPWARD (λ1)
<--------- DOWNWARD (λ2)

Characteristic of Frequency Discriminator 141

SIGNAL TRANSMISSION SYSTEM AND METHOD FOR SUPERVISING THE SAME

CROSS REFERENCE TO RELATED APPLICATION

This application claims the priority of Applications No. H09-109248, filed Apr. 25, 1997 in Japan, and No. H10-019222, filed Jan. 30, 1998 in Japan, the subject matters of which are incorporated herein by reference.

TECHNICAL FIELD OF THE INVENTION

The present invention relates to a signal transmission system and a method for supervising the same, and more particularly, to an optical transmission system and a method for supervising the same using a simulator.

BACKGROUND OF THE INVENTION

In the recent years, an optical transmission system using an optical amplifier, which directly amplifies a light signal without converting it it into an electric signal has been increasingly employed. For increasing the amount of light signals to be transmitted through a single optical amplifier, a wavelength multiplex type and a two-way transmission type of optical amplifiers have been proposed. Such an optical amplifier directly amplifies a light signal in analog fashion using an excitation light without converting it the light signal into an electric signal. When such an optical amplifier is used in a linear repeater, a supervisory light is provided in addition to a main signal to supervise the optical amplifier. The supervisory light is converted into an electric signal.

A conventional optical transmission system usually includes an optical transmitter, an optical switching device, etc. In such an optical transmission system each device is provided with a loop-back circuit to control the system. When a serious problem, such as a signal loss or out-of-frame occurs, the loop-back circuit detects and determines a location of the trouble. The location of the trouble would be in the optical transmitter, an optical receiver, an optical fiber, and the like.

In the conventional optical transmission system, when a bit-error occurs, an alarm is created and the current transmission line having the error is changed to an auxiliary line. Then, the element (package) that caused the trouble is detected and is changed.

According to the above-described conventional optical transmission system, even if trouble occurs at only one location on the current transmission line, an auxiliary line is used instead.

To decrease the opportunities of changing inferior devices, each device, such as an optical transmitter, an optical receiver and an optical repeater, needs to have enough margin for itself. If it does, it is difficult to have a wide range of system margin for the whole system.

In an optical transmission system using an optical amplifier, when a high power light is supplied into an optical transmission line, enough SN margin can be obtained. However, in response to the high power input light, an undesirable non-linear effect is generated in the optical transmission line. Such a non-linear effect influences deterioration of transmission quality. In this situation, when an output power of the optical amplifier is changed, it gets more difficult to have enough range of system margin.

If the transmission system does not have enough system margin, a plurality of alternative transmission lines has to be prepared. Even if the current transmission line has a small problem, the transmission line has to be changed to another one, because the system margin of each transmission line is small.

OBJECTS OF THE INVENTION

Accordingly, an object of the invention is to provide a transmission system, which is able to obtain a large range of system margin.

Accordingly, an object of the invention is to provide a method for supervising a transmission system so that the system has a large range of margin as a whole.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the invention, a signal transmission system includes an interface unit that monitors the operating condition of each device. The signal transmission system also includes a simulator that simulates the transmission quality of the system in response to the operating condition of each device, and controls each device so as to optimize the transmission quality.

According to a second aspect of the invention, an optical transmission system includes interface units that detect predetermined estimation parameters from the optical transmitter, the repeater and the optical receiver. The optical transmission system includes a simulator that simulates the transmission quality of the system in response to the estimation parameters supplied from the interface units. The simulator also controls each of the optical transmitter, the repeater and the optical receiver so as to minimize a bit-error rate or to maximize a Q-factor.

According to the invention, predetermined estimation parameters are monitored from each device to estimate (calculate) a bit-error rate or Q-factor. Then, the simulator calculates the optimum control values so as to minimize the bit-error rate or to maximize the Q-factor, and controls each device in accordance with the optimum control values. As a result, the optical transmission system has the maximum system margin. Therefore, even if some devices operate out of their margin, the transmission system still operates in a range of its system margin as a whole. Consequently, it is not always required to establish an auxiliary line in addition to the main transmission line.

BRIEF DESCRIPTION OF THE DRAWINGS

FIG. 9 is a table used for explaining the simulating operation of the optical transmission system and the method for supervising the same, according to the first preferred embodiment.

DETAILED DISCLOSURE OF THE INVENTION

The invention is applicable to an optical communication system, such as a basic trunk transmission system, a subscriber network system, etc.

First Preferred Embodiment

Figure 1:
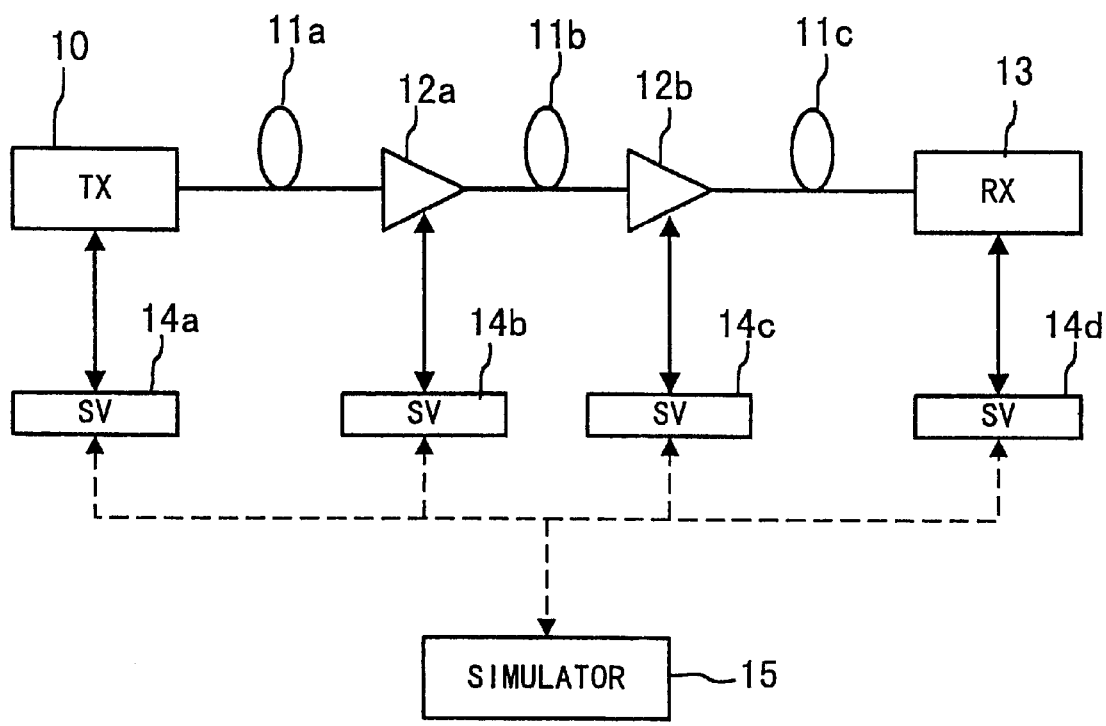
FIG. 1 is a conceptual view showing an optical transmission system, according to a first preferred embodiment of the invention.

FIG. 1 shows the outline of an optical transmission system using an optical transmission simulator, according to a first preferred embodiment of the invention. In this system, a plurality of EDFAs (Erbium-Doped Fiber Amplifier) are employed as optical amplifiers.

In FIG. 1, the optical transmission system includes an optical transmitter (TX) 10, optical fibers 11a, 11b and 11c, repeaters 12a and 12b, an optical receiver (RX) 13, interface units 14a, 14b, 14c and 14d and an optical simulator 15. Each repeater is equipped with an optical amplifier, which amplifies a light signal. The optical fiber 11a connects the optical transmitter 10 and the repeater 12a. The optical fiber 11b connects repeaters 12a and 12b. The optical fiber 11c connects the repeater 12b and the optical receiver 13. The interface units 14a, 14b, 14c and 14d are connected to the optical transmitter 10, the repeater 12a, the repeater 12b and the optical receiver 13, respectively. Each of the interface units (SV) 14a, 14b, 14c and 14d monitors and controls each device connected thereto. The simulator 15 is connected to the interface units 14a, 14b, 14c and 14d with a communication line, such as a telephone line, a supervisory network, etc. The simulator 15 simulates the operation of the system based on information from the interface units (SV) 14a, 14b, 14c and 14d.

The optical transmitter (TX) 10 converts an electric signal into a light signal having a specific wavelength, and transmits it to the repeater 12a via the optical fiber 11a. For improving transmission reliability, the system may have two alternative system lines of a "0 system" and "1 system". The main system line is usually used, and the other system line is used when a problem happens on the main system line.

As mentioned above, each of the repeaters 12a and 12b is provided with an amplifier, which amplifies a received light signal in analog fashion, and transmits the amplified signal to the following device.

The interface units 14a, 14b, 14c and 14d are supervisory units, each of which detects estimation parameters from the connected device, and controls the device.

The simulator 15 is composed of a workstation, application software for simulation, and the like to estimate an error-bit rate or a Q-factor of the system based on the current operating condition of each device. The current operating condition is obtained from the estimation parameters.

In FIG. 1, the communication line shown by a broken line can be any kind of communication systems, besides a telephone line and a supervisory network.

Now, the operation of the above-described optical transmission system and a method for supervising the system is described.

Deterioration of an SN (Signal to Noise) ratio and waveform of a light signal, transmitted through the optical fibers 11a, 11b and 11c mainly influence transmission quality of the optical transmission system. In more detail, the transmission quality may be influenced by an extinction ratio of the optical transmitter 10, an NF (Noise Figure) of the optical repeaters 12a and 12b, a Q-factor of the optical receiver 13, a propagation loss of the transmission line 11a, 11b and 11c, a dispersion coefficient and power variation (level-diagram) in the transmission lines 11a, 11b and 11c.

Figure 2:
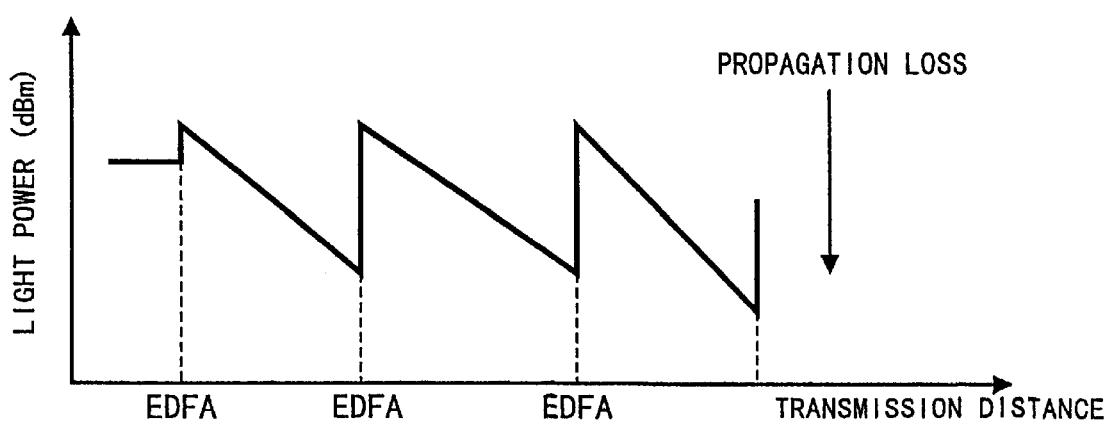
FIG. 2 is a graph showing a level-diagram used for explaining the operation of the optical transmission system and the method for supervising the same, according to the first preferred embodiment.

The SN ratio is deteriorated when a low level light signal is received by the repeaters 12a and 12b and the optical receiver 13. On the other hand, a waveform of the light signal is deteriorated due to non-linear effect in the transmission lines 11a, 11b and 11c when a power of an input light is too high. The level-diagram shown in FIG. 2 represents the variation of power levels of the light signal, transmitted through the optical fibers 11a, 11b and 11c and the optical repeaters 12a and 12b, relative to positions on the transmission line.

In this invention, the above described estimation parameters, which are the factors deteriorating the transmission quality, are monitored and controlled to obtain the maximum system margin. The system margin can be maximized based on the Q-factor of the optical receiver 13.

In the first preferred embodiment, the estimation parameters are actually measured (detected), and the measured values are supplied through the interface units 14a, 14b, 14c and 14d to the simulator 15. The simulator 15 estimates the bit-error rate or the Q-factor, in accordance with which the level-diagram of each device and a level discrimination point of the optical receiver 13, which are controlled so that the system margin would be the maximum.

The simulator 15 needs the following parameters to estimate the bit-error rate or the Q-factor:

Optical Transmitter

The estimation parameters about the optical transmitter 10 include a false random signal number (bit number), a transmission speed, a wavelength of a signal light, an α parameter and an extinction ratio of an optical modulator, and an SN ratio.

Optical Fibers (Transmission Lines)

The estimation parameters about the optical fibers 11a, 11b and 11c include first-order dispersion and second-order dispersion for each wavelength, a non-linear constant, a fiber length, a propagation loss and an input light power.

Optical amplifiers (Repeaters 12a and 12b)

The estimation parameters about the optical amplifiers in the repeaters 12a and 12b include a signal gain, an NF (Noise Figure) and an input/output light power.

Optical Filter

The estimation parameters about an optical filter include a transmission bandwidth and an insert loss. The optical filter is arranged at an upward side of the optical receiver 13 for removing ASE (Amplified Spontaneous Emission) noise.

Optical Receiver

The estimation parameters about the optical receiver 13 include an O/E conversion factor, a receiving bandwidth (electric) and a Q-factor.

Next, the sequence for maximize the system margin is described.

For maximizing the system margin, the Q-factor of the received signal at the optical receiver 13 is controlled to be the maximum or the bit-error rate is controlled to be the minimum.

(1) Collection of Estimation Parameters

Each device monitors its own estimation parameters except for the parameters that are known when the system is installed. Those parameters are supplied through the connected interface unit to the simulator 15. The simulator 15 may includes a workstation (WS) connected through a supervisory network, for example, using a 10BASE-T.

(2) Calculating Control Factors

An output power of each optical amplifier can be controlled even after the network is established (installed). The Q-factor of an electric signal, which is to be discriminated by the optical receiver 13, is defined based on a noise generated in the optical amplifier and waveform deterioration caused by a non-linear effect in the optical fibers. The level discrimination point in the optical receiver 13 is optimized when the system is installed.

When the input power of an optical amplifier is high (that is, the output power of the previous optical amplifier is high), an S/N ratio of the amplifier becomes high. On the other hand, however, waveform deterioration of the signal becomes remarkable. The output power of each optical amplifier is calculated so that the Q-factor becomes the maximum.

(3) Control of Devices

In the reverse way of the Collection of Parameters (1), the simulator 15 controls each optical amplifier contained in a device to have the optimum output power.

Next, the operation of the simulator 15 is described in conjunction with FIGS. 3 through 11.

Figure 3:
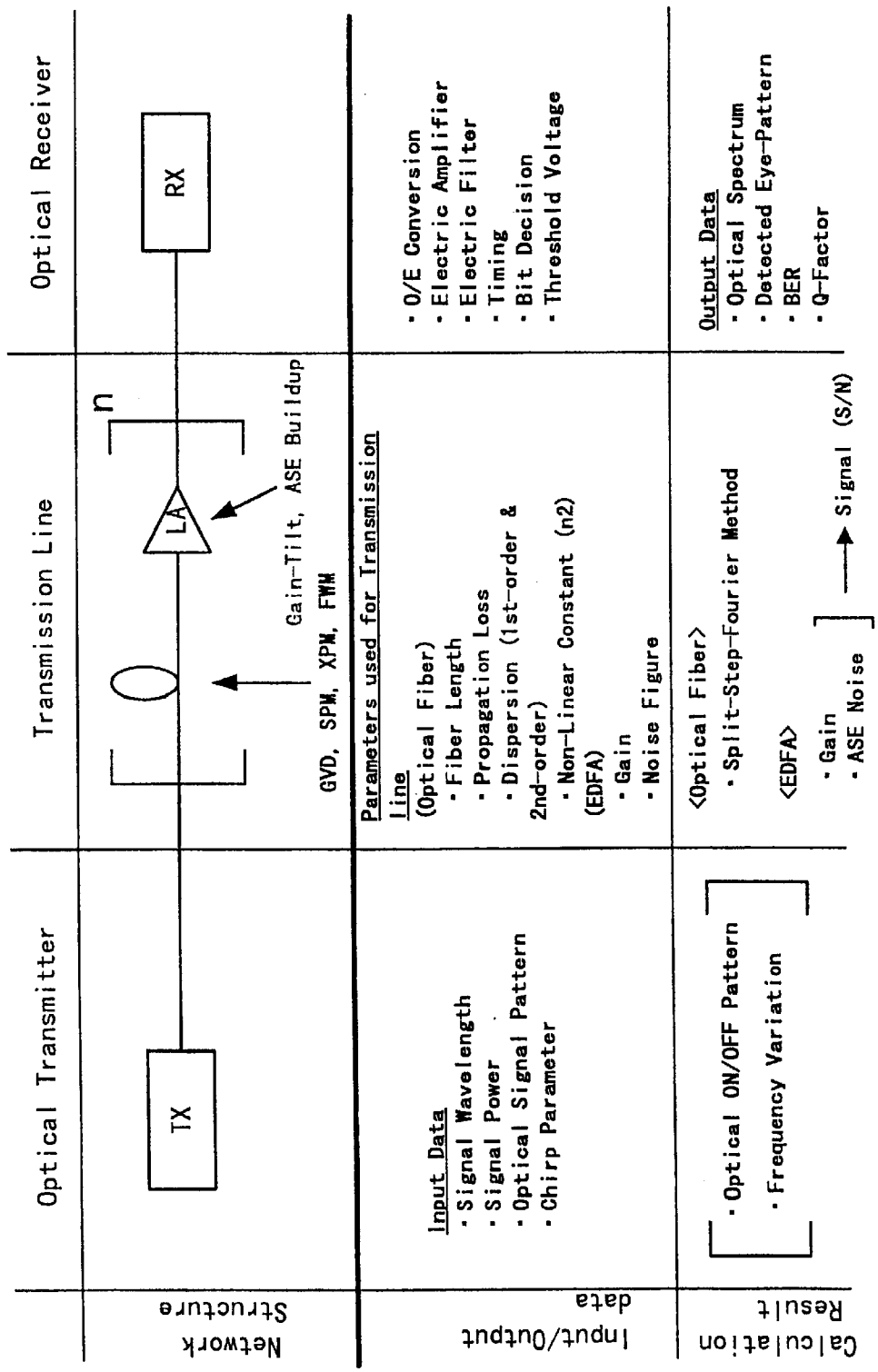
FIG. 3 is a table used for explaining the simulating operation of the optical transmission system and the method for supervising the same, according to the first preferred embodiment.

FIG. 3 shows the outline of the operation of the simulator 15. In FIG. 3, the upper row shows the configuration of the system (system setup), the middle row shows calculating operation (calculation) and the lower row shows calculating operation (calculation).

It is assumed that "n" number of wavelengths, $\lambda 1$ to $\lambda n$, are multiplexed in the optical fiber 11a passing through an optical amplifier (LA). In the first preferred embodiment, the number "n" is one (n=1).

When a light signal is transmitted to the optical receiver 13, the light signal is converted into an electric signal by an O/E converter circuit in the optical receiver 13. The optical receiver 13 amplifies the electric signal for discrimination and reproduction. The estimation parameters such as an O/E conversion efficiency are converted into digital signals by an A/ID converter circuit. The digital signals are supplied to a CPU, and to the simulator 15 through the interface unit 14d.

In more detail, the optical transmitter 10 supplies the estimation parameters of a light wavelength, a signal input power, an optical signal pattern and a chirp level to the simulator 15. The simulator 15 performs calculation in accordance with an optical signal sequence, shown in FIG. 4, using the ON/OFF pattern (optical signal pattern) and the chirp level. The calculations sequence will be described later.

The optical fibers 11a, 11b and 11c supply estimation parameters of a GVD (Group Velocity Delay), an SPM (Self Phase Modulation), an XPM (Xross Phase Modulation) and an FWM (Four Wave Mixing). Each optical amplifier supplies estimation parameters of a gain tilt and a distortion, caused by an ASE (Amplified Spontaneous Emission) integration.

Based on the data (estimation parameters) from the optical transmission line, the simulator 15 analyzes a signal waveform in the optical transmission line in accordance with the Split-Step-Fourier scheme. For the optical fiber amplifiers, using an EDFA (Erbium-Doped Fiber Amplifier), a signal quality is estimated based on its gain and ASE noise. For the simulating calculation of the optical transmission line, data of the fiber length, propagation loss, dispersion (first-order and second-order) and nonlinear constant (n2) are collected from the optical fibers 11a, 11b and 11c. The data (estimation parameters) of the gain and NF Noise Figure) are collected from the EDFAs.

Figure 4:
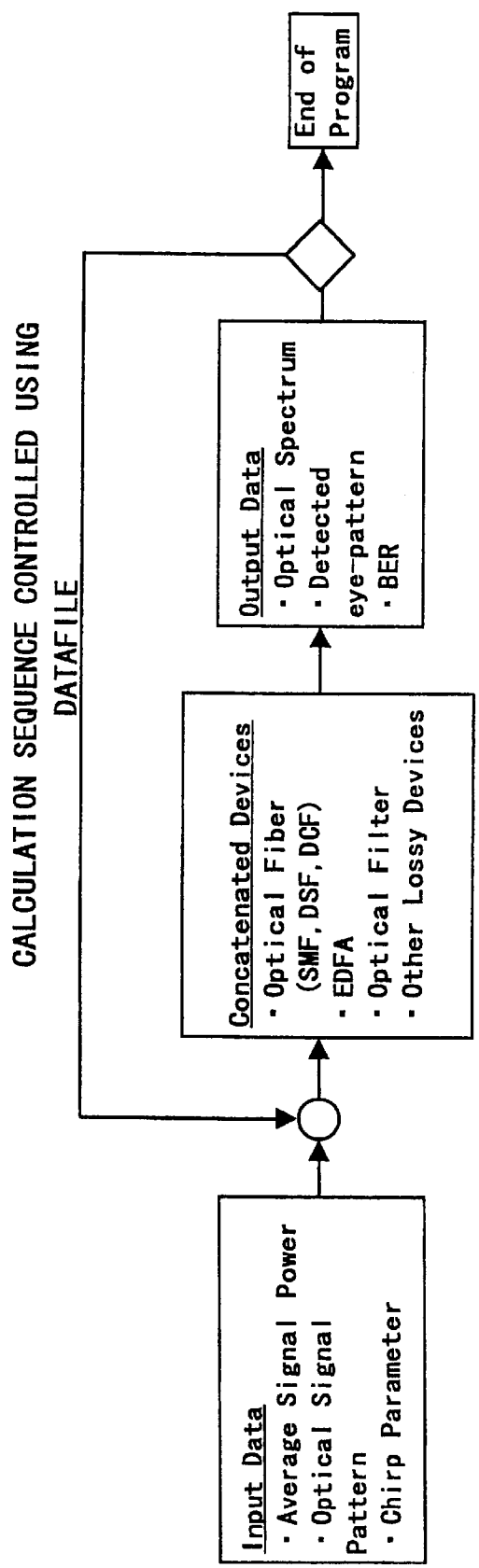
FIG. 4 is a block diagram showing a simulating calculation flow used for explaining the simulating operation of the optical transmission system and the method for supervising the same, according to the first preferred embodiment.

FIG. 4 shows the flow of the simulating calculation in the simulator 15. In FIG. 4, input data (estimation parameters) including the average signal power, optical signal pattern and chirp level are supplied to the simulator 15. In the optical transmission system, the following devices are further connected: an optical fiber, such as an SMF (Single Mode Fiber); a DSF (Dispersion Shift Fiber); a DCF (Dispersion Compensation Fiber); an EDFA; an optical filter and other devices.

Based on the propagation loss of the optical fibers 11a, 11b and 11c, the gain of the optical amplifier (LA) of the EDFA, the gain-tilt and the ASE integration, the simulator 15 performs a predetermined calculation. The source data (estimation parameters) and the calculation results are stored in a data file so that the calculation sequence is controlled based on the data file. The simulation provides output data of an optical spectrum, a received waveform (eye-pattern) and a BER Bit-Error Rate).

Figure 5:
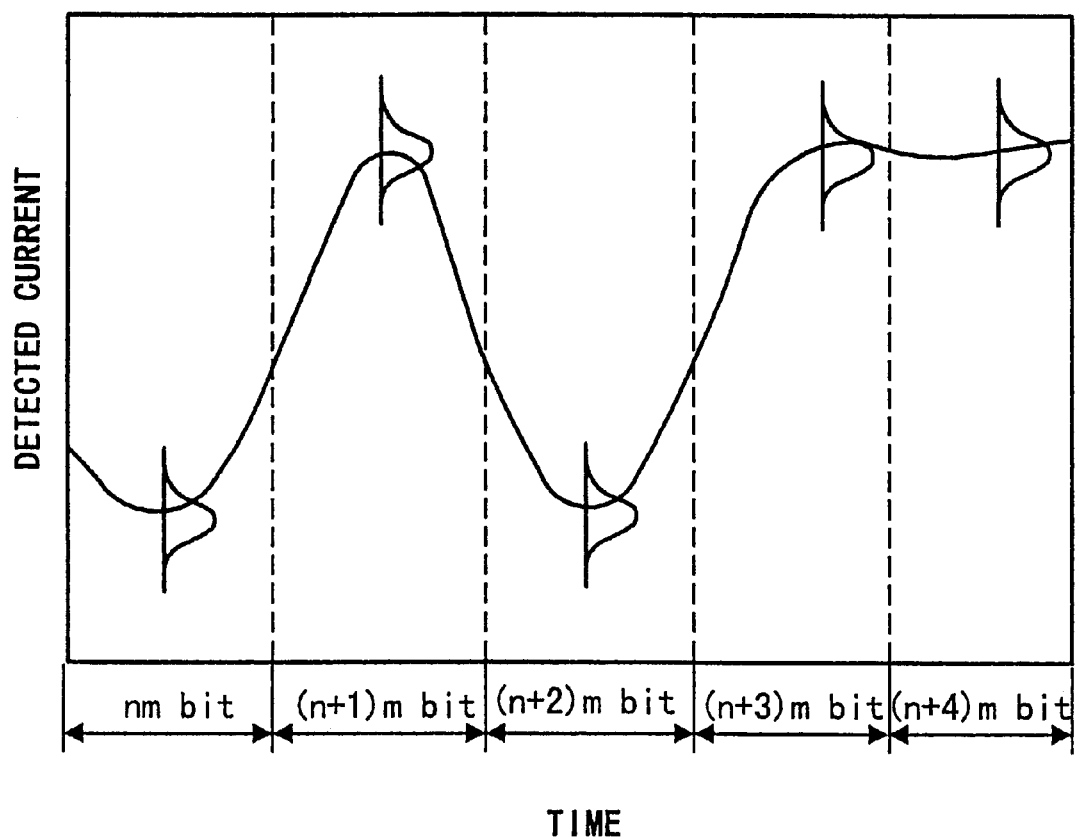
FIG. 5 is a graph showing a received current waveform used for explaining the simulating operation of the optical transmission system and the method for supervising the same, according to the first preferred embodiment.
Figure 6:
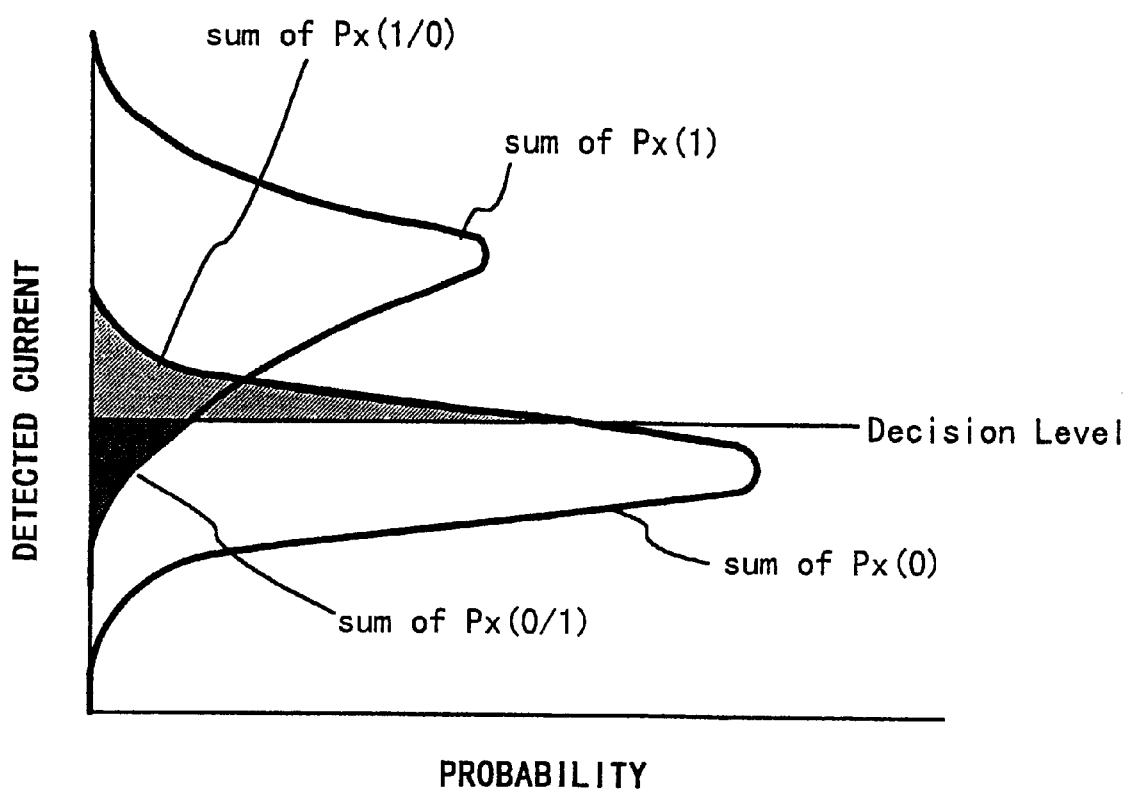
FIG. 6 is a graph showing a noise density distribution of a received electric signal used for explaining the simulating operation of the optical transmission system and the method for supervising the same, according to the first preferred embodiment.
Figure 7:
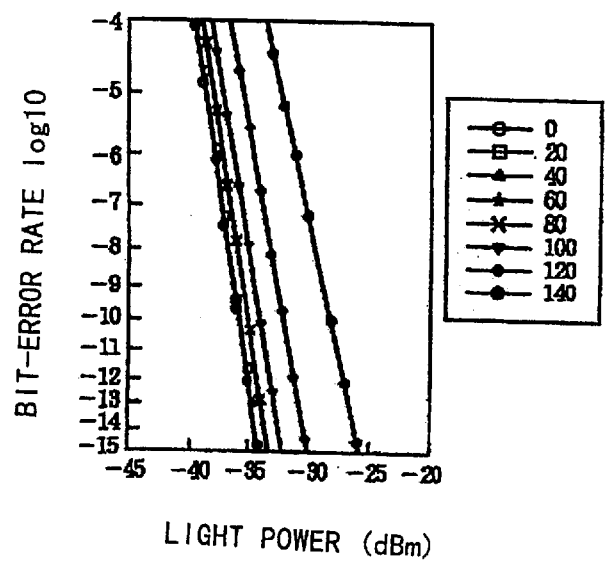
FIG. 7 is a graph showing the relation between a received light power and a bit-error rate, used for explaining the simulating operation of the optical transmission system and the method for supervising the same, according to the first preferred embodiment.
Figure 8:
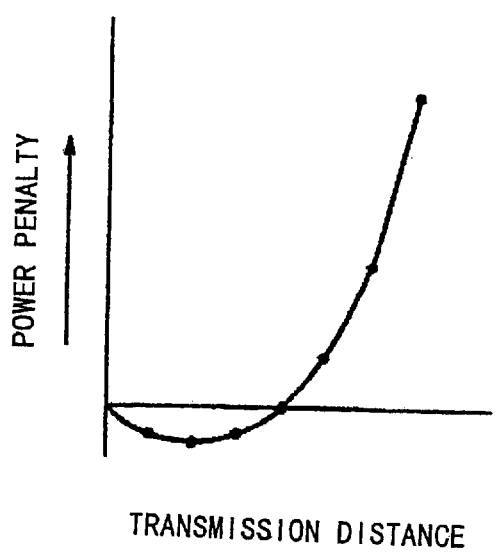
FIG. 8 is a graph showing the relation between a transmission distance and a power penalty, used for explaining the simulating operation of the optical transmission system and the method for supervising the same, according to the first preferred embodiment.

FIGS. 5 to 8 show a variation of the bit-error rate and power penalty. FIG. 5 shows a waveform of the detected current signal, FIG. 6 shows the noise density distribution of the detected current signal, FIG. 7 shows the relation between the detected light power and the bit-error rate, and FIG. 8 shows a variation of the power penalty relative to transmission distances. The above-described simulating calculation is started with FIG. 5 to FIG. 8 so as to obtain the data shown in FIG. 8. The power penalty represents the variation of the detected light power relative to transmission distances, using the reference level of the light power with a distance of zero.

Figure 10:
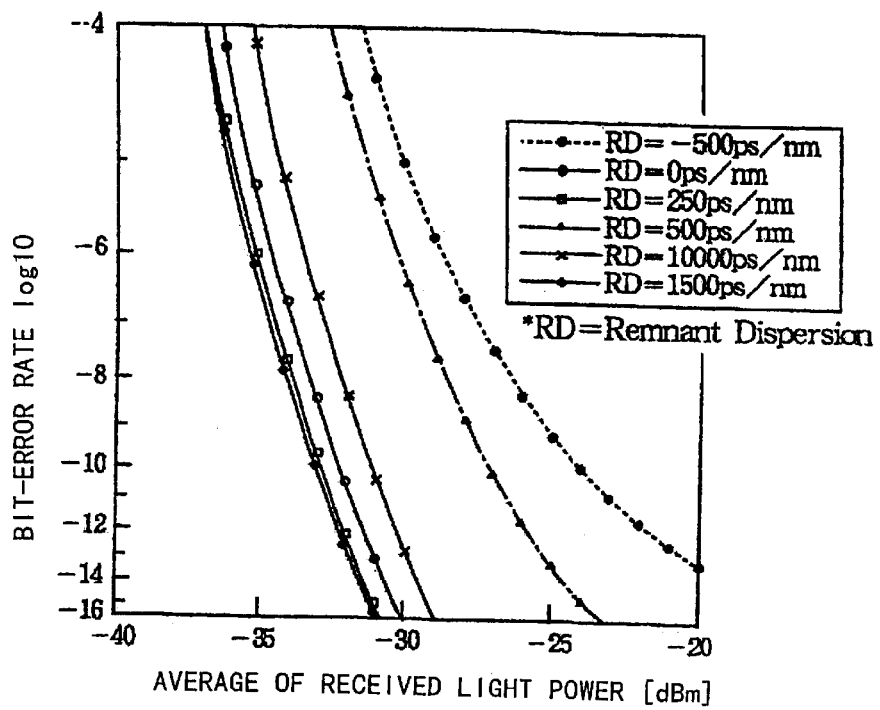
FIG. 10 is a graph showing the variation of simulated bit-error rate, used for explaining the simulating operation of the optical transmission system and the method for supervising the same, according to the first preferred embodiment.
Figure 11:
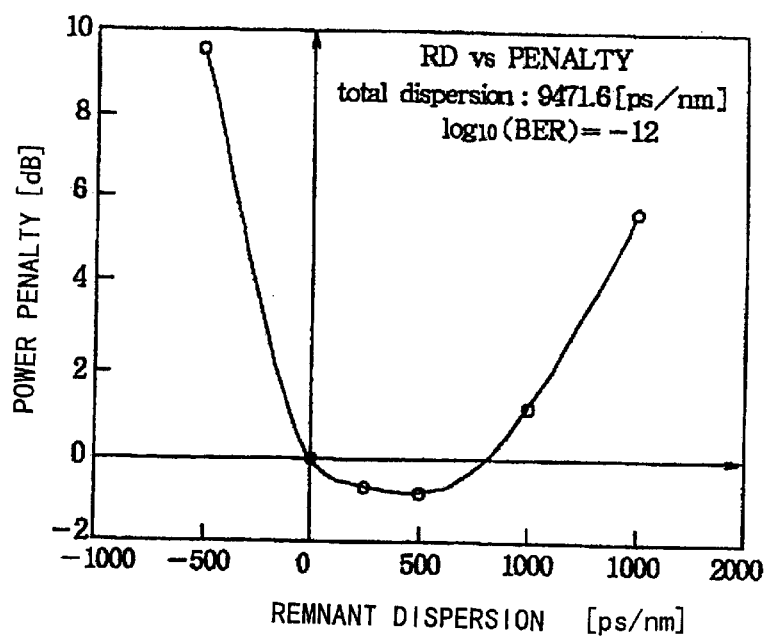
FIG. 11 is a graph showing the variation of simulated power penalty, used for explaining the simulating operation of the optical transmission system and the method for supervising the same, according to the first preferred embodiment.

FIGS. 9 to 11 show the contents of real calculations, carried out by the simulator 15. FIG. 9 shows specifications of the simulating calculation both in the cases of a single channel mode (single wavelength) and a WDM mode. FIGS. 10 and 11 show characteristics of the bit-error rate and the power penalty, calculated from the simulation under the condition shown in FIG. 9. In the first preferred embodiment, the simulation is carried out for a single channel transmission.

Referring again to FIG. 1, in the first preferred embodiment, each of the optical transmitter (TX) 10, the optical transmission line 11, the repeaters 12a and 12b and the optical receiver (RX) 13 supplies the estimation parameters (source data) through the interface units (SV) 14a–d to the simulator 15. The simulator 15 estimates the BER (Bit-Error Rate) or a Q-factor, in accordance with the above-described simulating operation, and controls the level-diagram of each device and the level discrimination point of the optical receiver 13 so that the optical transmission system has the maximum margin (system margin) as a whole.

When the optical transmission system is installed, the simulator 15 performs the above-described calculation based on inspected data of each device, so that the future system margin can be estimated. In addition, the simulator 15 can calculate the optimum condition for each device, and control each device based thereon to obtain the maximum system margin at the beginning.

As described before, the optical transmission system and the method for supervising the same, according to the first preferred embodiment, estimation parameters that deteriorate transmission quality are detected from each device. And, the simulator 15 simulates a bit-error ratio or a Q-factor, and controls each device so as to minimize the bit-error ratio or to maximize the Q-factor. Therefore, the optical transmission system can have the optimum system margin even when the system has been installed and in operation.

Second Preferred Embodiment

Figure 12:
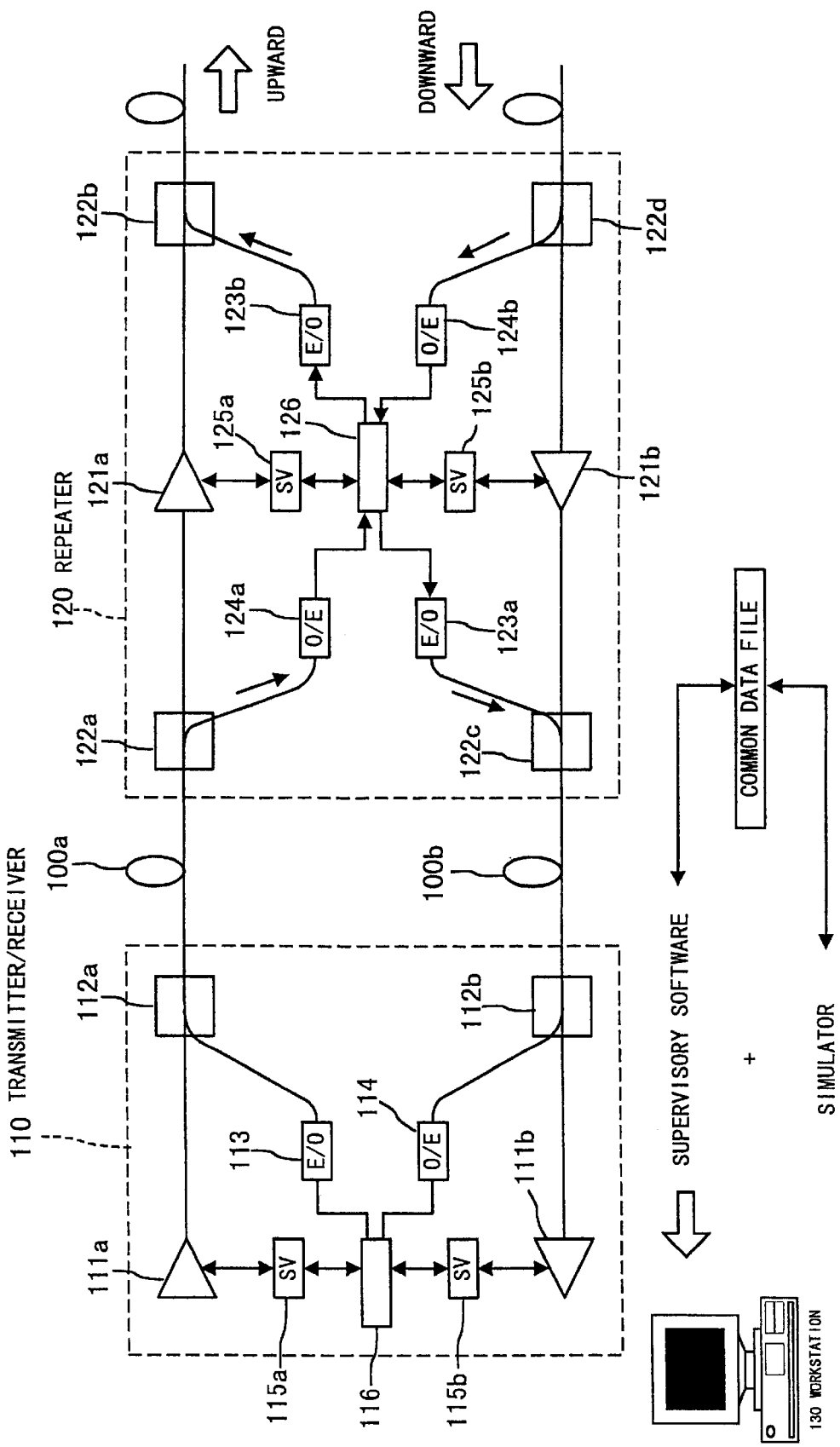
FIG. 12 is a block diagram showing the structure of an optical transmission system and a method for supervising the same, according to a second preferred embodiment of the invention.

FIG. 12 shows an optical transmission system, which performs automatic detection/control using a supervisory network. The system is provided with optical fiber amplifiers of EDFA (Erbium-Doped Fiber Amplifier).

The optical transmission system includes a transmitter/receiver 110, a repeater 120, a workstation (WS) 130, which automatically collects estimation parameters (source data) from each device to control the devices using the supervisory network.

The transmitter/receiver 110 and the repeater 120 are connected with transmission lines 100a and 100b of optical fibers, which transmit both of two main signal lights and a supervisory light. The main signal lights are wavelength-multiplexed to be transmitted in the both directions in the optical fibers 100a and 100b.

The transmitter/receiver 110 includes optical amplifiers 111a and 111b; optical couplers 112a and 112b, which divide a light by wavelength and direction; an E/O converter 113; an O/E converter 114, interface units (SV) 115a and 115b and a controller 116.

The optical amplifier 111a is connected to an input terminal of the optical coupler 112a and the interface unit 115a. The optical coupler 112a is connected at the other input terminal to the E/O converter 113. The controller 116 is connected to the interface unit 115a, the E/O converter 113, the O/E converter 114 and to the interface unit 115b. The O/E converter 114 is connected to an output terminal of the optical coupler 112b. The optical amplifier 111b is connected to the interface unit 115b and to the other output terminal of the optical coupler 112b.

At the transmission side of the transmitter/receiver 110, an electric signal is converted into a light signal to have a specific wavelength. The light signal is supplied to the optical amplifier 111a. At the receiver side, the light signal with the specific wavelength is received, and is converted into an electric signal. The electric signal is divided and supplied to subscribers (not shown), or the like.

The repeater 120 includes optical amplifiers 121a and 121b; optical couplers 122a, 122b, 122c and 122d, each of which divides a light signal for each wavelength/direction; E/O converters 123a and 123b; O/E converters 124a and 124b; interface units (SV) 125a and 125b and a controller 126. The repeater 120 amplifies the received light signal in analog fashion, and also receives/supplies the supervisory signal between two adjacent transmitter/receivers 110.

The optical coupler 122a is connected at an input terminal to the optical coupler 112a in the transmitter/receiver 110 though the optical fiber 100a. The optical coupler 122a is also connected at output terminals to the optical amplifier 121a and to the O/E converter 124a. The optical amplifier 121a is connected to the interface unit 125a and to an input terminal of the optical coupler 122b. The optical coupler 122b is connected at the other input terminal to the E/O converter 123b. The controller 126 is connected to the O/E converters 124a and 124b, the E/O converters 123a and 123b and to the interface units 125a and 125b. The optical coupler 122d is connected at output terminals to the O/E converter 124b and the optical amplifier 121b. The optical coupler 122c is connected at input terminals to the E/O converter 123a and the optical amplifier 121b, and at the output terminal to the optical coupler 112b in the transmitter/receiver 110 via the optical fiber 100b.

The workstation (WS) 130 includes a simulator and monitor/control software, and is provided with a common data file for the estimation parameters, described in the first preferred embodiment. The workstation (WS) 130 is connected to the transmitter/receiver 110 and the repeater 120 to supervise the transmission line and each device and to collect the parameters from each device for automatic control of each device via the supervisory network.

Next, the operation of the above-described optical transmission system, using the supervisory network, will be described. The transmitter/receiver 110 converts an electric signal into a light signal to have a specific wavelength and transmits the light signal to the repeater 120 via the optical fiber 100a. The transmitter/receiver 110 also receives a light signal, and converts the light signal into an electric signal to be supplied to subscriber lines.

The repeater 120 amplifies the received light signal in analog fashion, and also receives/supplies the supervisory signal between two adjacent transmitter/receivers 110. The main signal lights are wavelength-multiplexed to be transmitted in two ways on the optical fibers 100a and 100b.

The supervisory light, transmitted between the transmitter/receiver 110 and the repeater 120, is designed to have a different wavelength from the main signal light, but the same in the whole system. In accordance with the current conditions of the transmission line, transmitter/receiver 110 and the repeater 120, the supervisory light is wavelength-multiplexed in the optical fibers 100a and 100b. As the supervisory light has the single wavelength in the whole system, the supervisory light is transmitted in a single way. In other words, two supervisory lights having opposite directions are never multiplexed in the same optical fiber.

The workstation (WS) 130 performs monitor/control operations for each estimation parameter in the upward and downward lines 100a and 100b on a constant cycle. The simulator in the workstation (WS) 130 collects the estimation parameters via the common data file to calculate the optimum parameters (control factors).

As described above, according to the second preferred embodiment, each device is arranged in the supervisory network, and the estimation parameters are detected from each device using the supervisory network to control each device automatically. Therefore, the optical transmission system always operates under the optimum condition.

Third Preferred Embodiment

Figure 13:
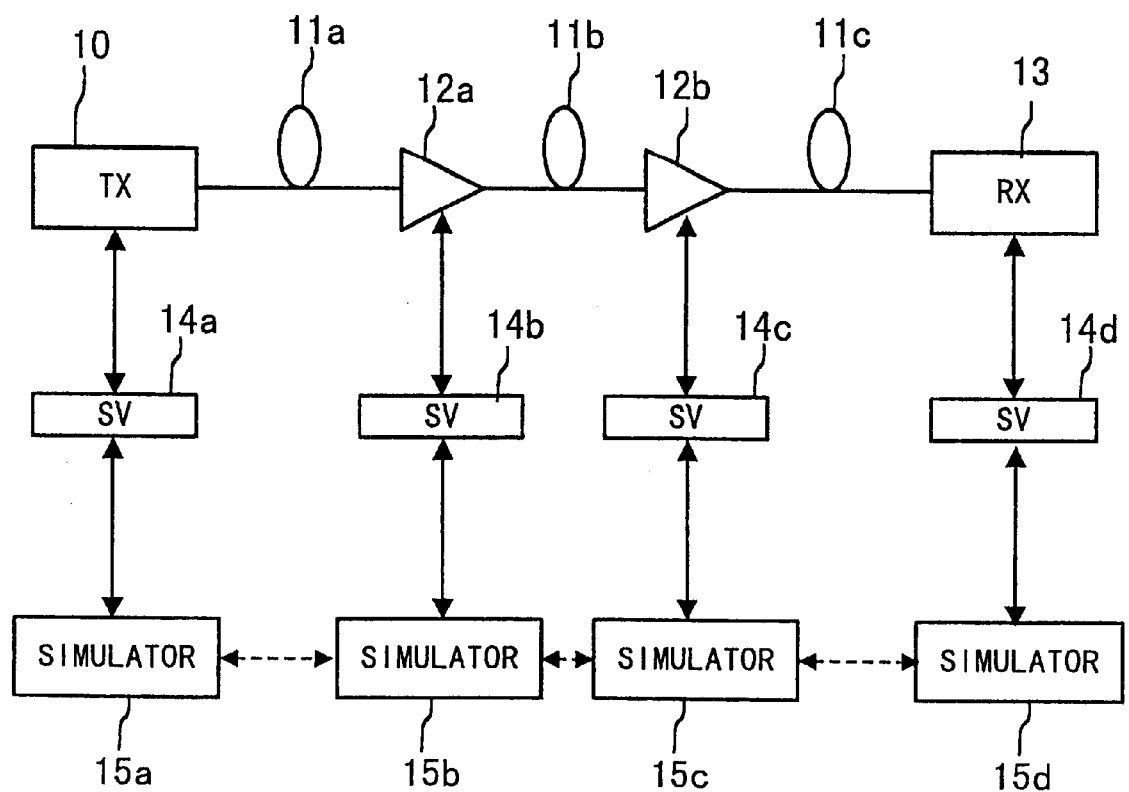
FIG. 13 is a block diagram showing the structure of an optical transmission system and a method for supervising the same, according to a third preferred embodiment of the invention.

FIG. 13 shows the outline of an optical transmission system using an optical transmission simulator, according to a third preferred embodiment of the invention. In this preferred embodiment, the same or corresponding components to the first preferred embodiment are indicated by the same symbols.

In FIG. 13, the optical communication system includes an optical transmitter (TX) 10; an optical transmission line, including optical fibers 11a, 11b and 11c; repeaters 12a and 12b; an optical receiver (RX) 13, which receives the light signal; interface units (SV) 14a, 14b, 14c and 14d; and simulators 15a, 15b, 15c and 15d.

The optical fiber 11a connects the optical transmitter 10 and the repeater 12a. The optical fiber 11b connects the repeaters 12a and 12b. The optical fiber 11b connects the repeater 12b and the optical receiver 13. The interface unit 14a is connected between the optical transmitter 10 and the simulator 15a. The interface unit 14b is connected between the repeater 12a and the simulator 15b. The interface unit 14c is connected between the repeater 12b and the simulator 15c. The interface unit 14c is connected between the optical receiver 13 and the simulator 15d.

Each of the repeaters 12a and 12b is equipped with an optical amplifier. Each of the interface units 14a, 14b, 14c and 14d monitors and controls the connected device. Each of the simulators 15a, 15b, 15c and 15d performs simulating operations based on estimation parameters of each device detected by the interface unit (SV). The simulators 15a, 15b, 15c and 15d are connected to each other by a communication line, shown by broken lines, such as a telephone line, a supervisory network, etc.

For instance, a workstation (WS) is arranged at a location where the optical transmitter (TX) 10 or one of repeaters 12a and 12b is placed. Each of the simulators 15a, 15b, 15c and 15d may be established by installing application software, performing the above-mentioned simulation, in the workstation.

According to the embodiment, a simulator is supplied to each device, therefore, each simulator (workstation) can simulate the operation of the corresponding area in parallel. As a result, processing time for simulation and control becomes shorter as compared to the system using a single simulator for all of the devices.

In the third preferred embodiment, shown in FIG. 13, when the communication line shown by the broken line is removed or ignored and each simulator monitors and controls the corresponding device independently, the processing speed can be further improved.

Fourth Preferred Embodiment

Figure 14:
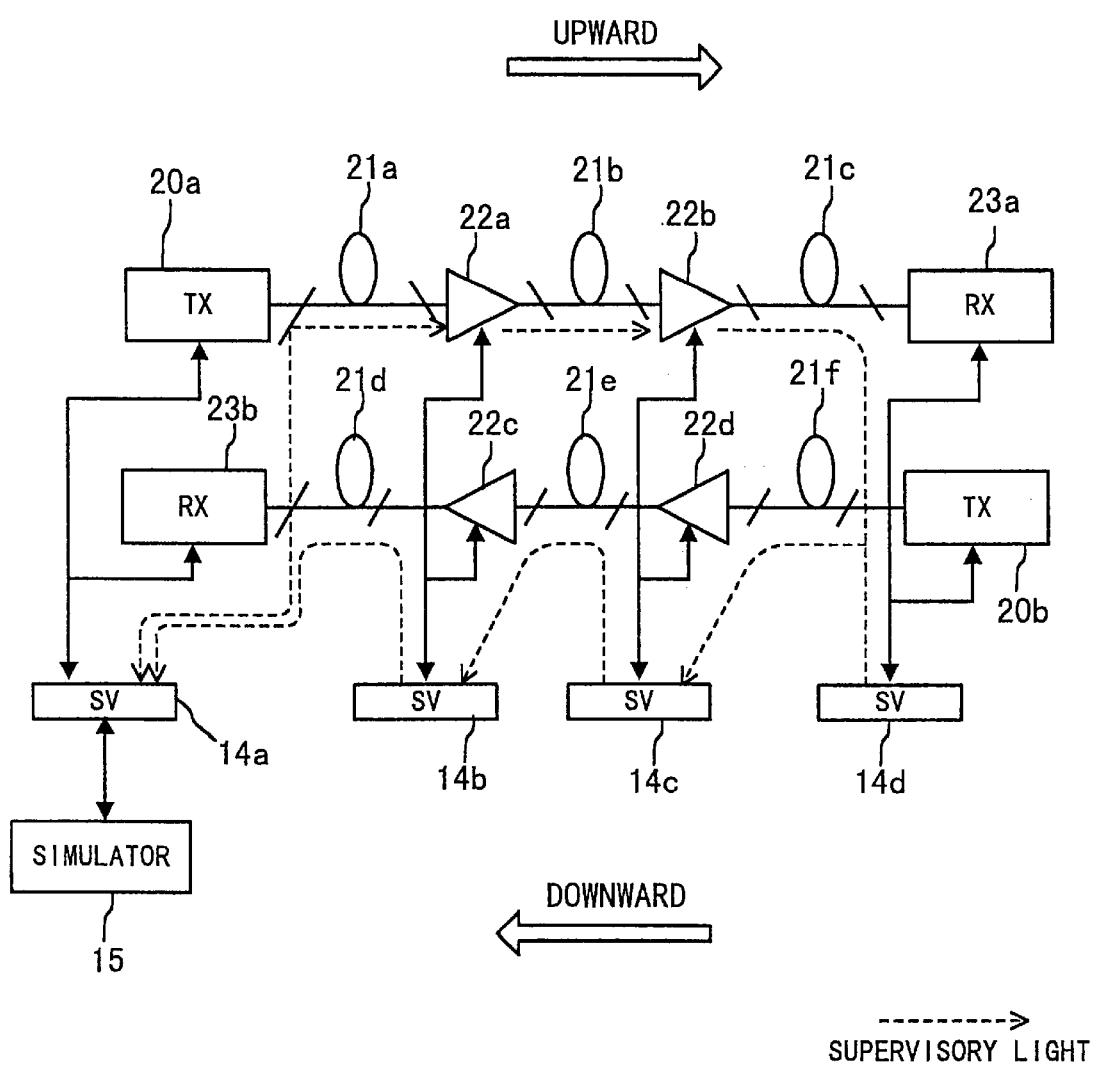
FIG. 14 is a block diagram showing the structure of an optical transmission system and a method for supervising the same, according to a fourth preferred embodiment of the invention.

FIG. 14 shows the outline of an optical transmission system using an optical transmission simulator, according to a fourth preferred embodiment of the invention. In this preferred embodiment, the same or corresponding components to the preferred embodiment, shown in FIG. 1, are indicated by the same reference numerals and symbols.

In FIG. 14, the optical transmission system includes optical transmitters (TX) 20a and 20b; optical transmission lines including optical fibers 21a, 21b, 21c, 21d, 21e and 21f; repeaters 22a, 22b, 22c and 22d; optical receivers 23a and 23b; interface units (SV) 14a, 14b, 14c and 14d, and a simulator 15. In the optical transmission system, an upward circuit is formed by the optical transmitter 20a, the repeaters 22a and 22b, the optical fibers 21a, 21b and 21c and the optical receiver 23a. On the other hand, a downward circuit is formed by the optical transmitter 20b, the repeaters 22c and 22d, the optical fibers 21d, 21e and 21f and the optical receiver 23b.

The optical transmitter 20a and the optical receiver 23b are connected to the interface unit 14a. The repeaters 22a and 22c are connected to the interface unit 14b. The repeaters 22b and 22d are connected to the interface unit 14c. The optical transmitter 20b and the optical receiver 23a are connected to the interface unit 14d.

In the upward circuit, the optical fiber 21a connects the optical transmitter 20a and the repeater 22a. The optical fiber 21b connects the repeaters 22a and 22b. The optical fiber 21c connects the repeater 22b and the optical receiver 23a. In the downward circuit, the optical fiber 21d connects the optical receiver 23b and the repeater 22c. The optical fiber 21e connects the repeaters 22c and 22d. The optical fiber 21f connects the repeater 22d and the optical transmitter 20b.

The optical transmitters 20a and 20b are designed to transmit wavelength-multiplexed light signals. Each of the repeaters 22a, 22b, 22c and 22d is equipped with an optical amplifier, which amplifies the light signal. The optical receivers 23a and 23b are designed to receive the multiplexed light signals. Each of the interface units 14a, 14b, 14c and 14d monitors and controls the device that is connected thereto with a communication line, such as a telephone line, a supervisory network, etc. The simulator 15 performs simulating operation based on estimation parameters of each device detected by the interface units 14a, 14b, 14c and 14d.

Each of the optical transmitters 20a and 20b, the repeaters 22a, 22b, 22c and 22d and the optical receivers 23a and 23b is designed to transmit a wavelength-multiplexed light signal. In the optical fibers 21a, 21b, 21c, 21d, 21e and 21f, supervisory signals, which are illustrated by broken lines, are wavelength-multiplexed to the main light signal.

In this embodiment, the supervisory signals have a wavelength that is different from the main signal light. The supervisory signals have the same wavelength in the whole system, and are multiplexed to one fiber selected from "m" fibers, based on the operating conditions of the optical fibers 21a, 21b, 21c, 21d, 21e and 21f, multiplexers and the repeaters 22a, 22b, 22c and 22d. Since the supervisory lights have the common wavelength in the whole system, the supervisory lights travel in one way. In other words, two supervisory lights traveling in the opposite directions are never multiplexed in the same optical fiber.

According to the above described optical transmission system, the supervisory lights are wavelength-multiplexed to the main signal light in the optical fibers 21a, 21b, 21c, 21d, 21e and 21f, so that an additional monitor network is not required for monitoring and controlling each device.

Fifth Preferred Embodiment

Figure 15:
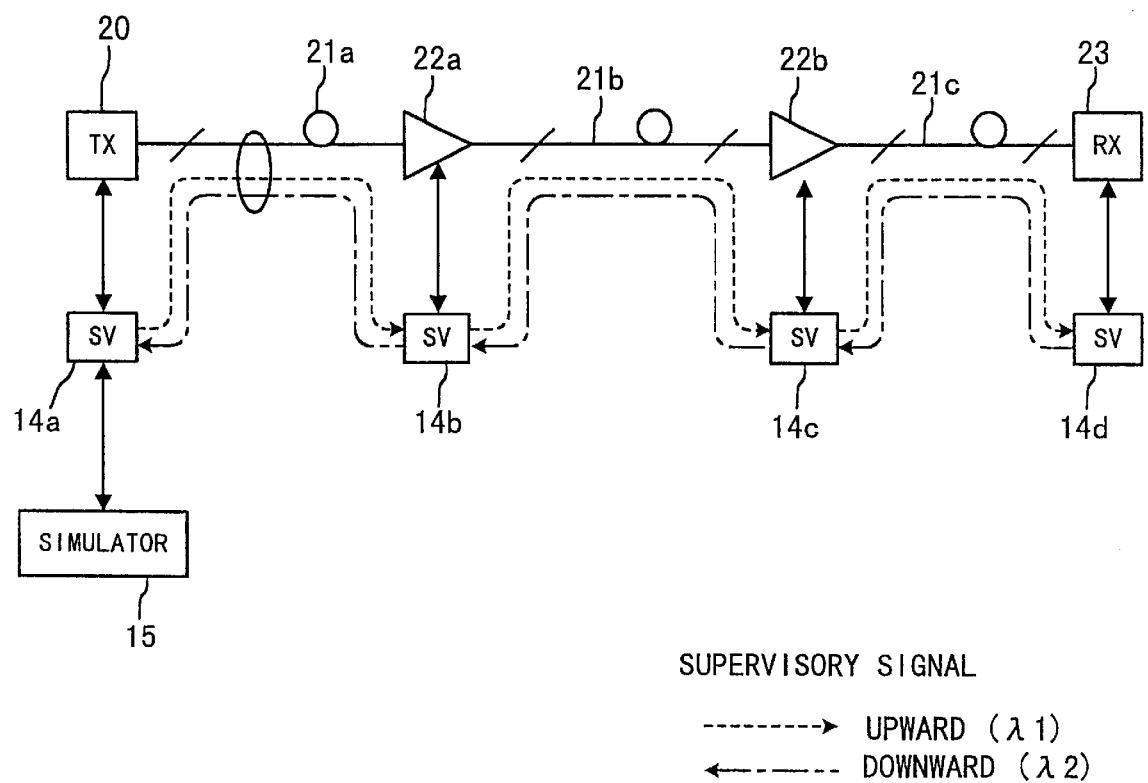
FIG. 15 is a block diagram showing the structure of an optical transmission system and a method for supervising the same, according to a fifth preferred embodiment of the invention.

FIG. 15 shows the outline of an optical transmission system using an optical transmission simulator, according to a fifth preferred embodiment of the invention. In this preferred embodiment, the same or corresponding components to the fourth preferred embodiment, shown in FIG. 14, are indicated by the same reference numerals and symbols.

In FIG. 15, the optical transmission system includes an optical transmitter 20, an optical transmission line including optical fibers 21a, 21b and 21c, repeaters 22a and 22b, an optical receiver 23, interface units (SV) 14a, 14b, 14c and 14d and a simulator 15. The interface units 14a, 14b, 14c and 14d are connected to the optical transmitter 20, the repeater 22a, the repeater 22b and the optical receiver 23, respectively. The interface units 14a, 14b, 14c and 14d are connected to each other by a communication line, such as a telephone line, a supervisory network, etc. The interface unit 14a is connected to the simulator 15. The optical fiber 21a connects the optical transmitter 20 to the repeater 22a. The optical fiber 21b connects the repeater 22a to the repeater 22b. The optical fiber 21c connects the repeater to the optical receiver 23.

The optical transmitter 20 transmits wavelength-multiplexed light signals. Each of the repeaters 22a and 22b is equipped with an optical amplifier, which amplifies the light signals. The optical receiver 23 receives the multiplexed light signals. Each of the interface units 14a, 14b, 14c and 14d monitors and controls the device connected thereto. The simulator 15 performs simulating operations based on estimation parameters of each device detected by the interface units 14a, 14b, 14c and 14d.

In FIG. 15, an upward way and a downward way are formed by the single transmission line, so that supervisory signals having the different wavelengths are multiplexed in the transmission line (21a, 21b and 21c) to perform a two-way transmission. In the figure, broken lines show the supervisory lights.

In this embodiment, the supervisory signals have the different wavelengths $\lambda 1$ and $\lambda 2$ between the upward and downward ways, so that each device can be monitored and controlled using the single transmission line.

Sixth Preferred Embodiment

Figure 16:
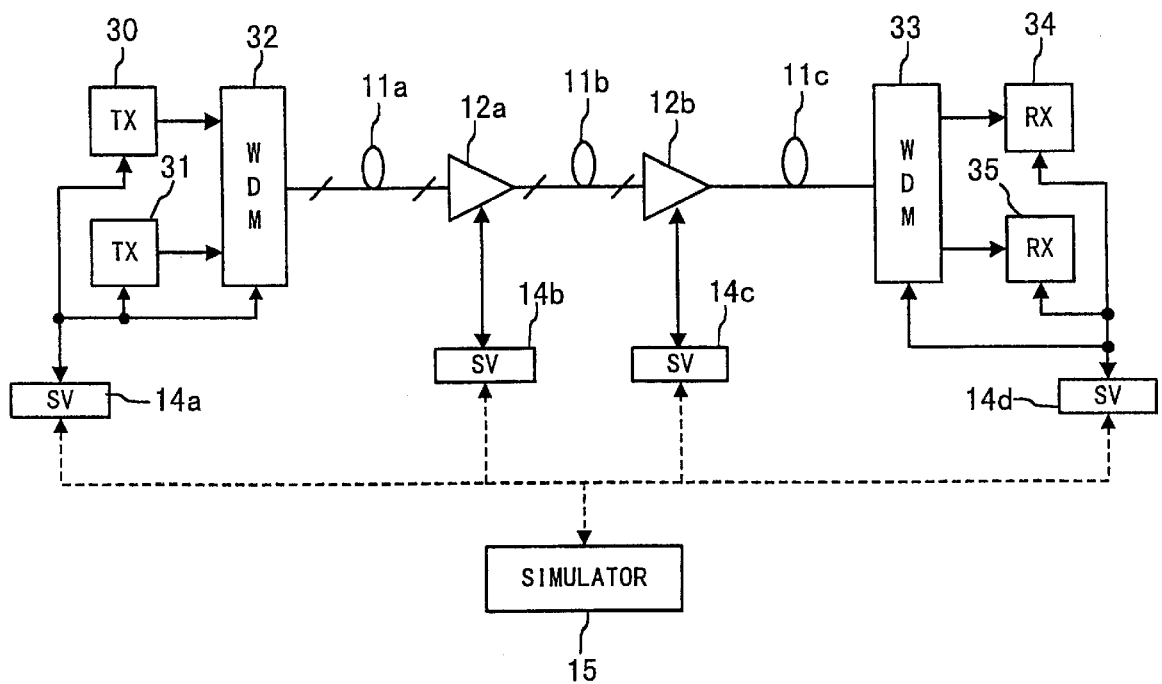
FIG. 16 is a block diagram showing the structure of an optical transmission system and a method for supervising the same, according to a sixth preferred embodiment of the invention.

FIG. 16 shows the outline of an optical transmission system using an optical transmission simulator, according to a sixth preferred embodiment of the invention. In this preferred embodiment, the same or corresponding components to the first preferred embodiment, shown in FIG. 1, are indicated by the same reference numerals and symbols.

In FIG. 16, the optical transmission system includes optical transmitters 30 and 31, a WDM (Wavelength Division Multiplexer) 32 at a transmitter side; an optical transmission line including optical fibers 11a, 11b and 11c, repeaters 12a and 12b, a WDM 33 at a receiver side, optical receivers 34 and 35, interface units (SV) 14a, 14b, 14c and 14d, and a simulator 15. The interface unit 14a is connected to the optical transmitters 30 and 31 and the WDM 32. The interface units 14b and 14c are connected to the repeaters 12a and 12b, respectively. The interface unit 14d is connected to the optical receivers 34 and 35 and the WDM 33. Each of the interface units 14a, 14b, 14c and 14d is connected to the simulator 15 by a communication line, such as a telephone line, a supervisory network, etc.

The optical transmitters 30 and 31 transmit different wavelengths of light signals. Each of the repeaters 12a and 12b is equipped with an optical amplifier, which amplifies the light signals. The optical receivers 34 and 35 receive the light signals having the different wavelengths. Each of the interface units 14a, 14b, 14c and 14d monitors and controls the device that is connected thereto. The simulator 15 performs simulating operations based on estimation parameters of each device detected by the interface units 14a, 14b, 14c and 14d.

The WDM 32 at the transmitter side is designed to multiplex light signals supplied from the transmitters 30 and 31 and transmit the multiplexed light signal to the optical fiber 11a. On the other hand, the WDM 33 at the receiver side is designed to divide the multiplexed light signal supplied from the optical fiber 11c and supply the divided light signals to the optical receivers 34 and 35.

Generally, in a wavelength-multiplex transmission using an optical amplifier, levels of an output signal of the amplifier are varied from wavelength to wavelength. As mentioned in the description of the first preferred embodiment, the variation of the light level changes the non-linear effect and SN ratio in the optical fiber. Therefore, the light level has to be controlled to have the optimum level for each wavelength. In other words, it is required that the margin, defined by the non-linear effect and SN ratio, is controlled to have the maximum value.

Accordingly, in this embodiment, the optical transmitters 30 and 31 and the optical receivers 34 and 35, between which different wavelengths of light signals are transmitted, are connected through the interface units (SV) 14a, 14b, 14c and 14d to the simulator 15. The characteristics of each device are detected and transmitted via the interface units (SV) 14a, 14b, 14c and 14d to the simulator 15. The simulator 15 estimates (calculates) the bit-error rate or Q-factor, and controls the level-diagram of each wavelength and the level discrimination point of the optical receivers 34 and 35 so as to obtain the maximum system margin.

This preferred embodiment can be used when another wavelength channel is added to the optical transmission system of the first preferred embodiment. As each device is supervised for each wavelength, the system can be controlled to operate under the optimum condition automatically.

Seventh Preferred Embodiment

Figure 17:
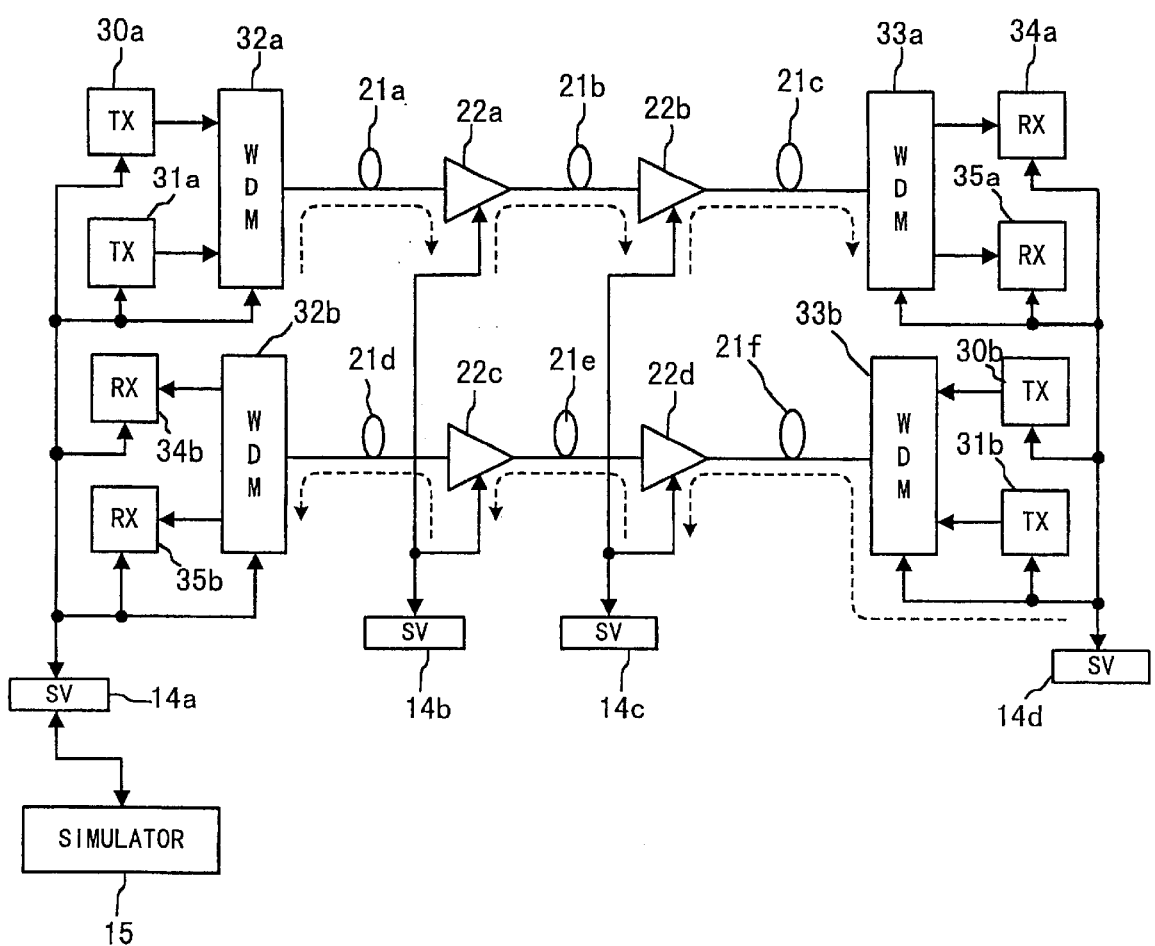
FIG. 17 is a block diagram showing the structure of an optical transmission system and a method for supervising the same, according to a seventh preferred embodiment of the invention.

FIG. 17 shows an optical transmission system using an optical transmission simulator, according to a seventh preferred embodiment of the invention. The same or corresponding components to shown in FIGS. 14 and 16 are indicated by the same reference numerals and symbols.

The seventh preferred embodiment is designed by applying the optical transmission simulator of the sixth preferred embodiment to the wavelength-multiplex system, transmitting light signals having the different wavelengths.

In FIG. 17, the optical transmission system includes an upward transmission circuit, a downward transmission circuit, interface units 14a, 14b, 14c and 14d and a simulator 15. The upward transmission circuit includes optical transmitters 30a and 31a, a WDM (Wavelength Division Multiplexer) 32a; an optical transmission line including optical fibers 21a, 21b and 21c, repeaters 22a and 22b, a WDM 33a at a receiver side and optical receivers 34a and 35a. The downward transmission circuit includes optical transmitters 30b and 31b, a WDM (Wavelength Division Multiplexer) 33b; an optical transmission line including optical fibers 21d, 21e and 21f, repeaters 22c and 22d, a WDM 32b at a receiver side and optical receivers 34b and 35b.

The interface unit 14a is connected to the optical transmitters 30a and 31a, WDMs 32a and 32b and the optical receivers 34b and 35b. The interface unit 14b is connected to the repeaters 22a and 22c. The interface unit 14c is connected to the repeaters 22b and 22d. The interface unit 14d is connected to the optical transmitters 30b and 31b, WDMs 33a and 33b and the optical receivers 34a and 35a. The interface unit 14a is connected to the simulator 15.

The optical transmitters 30a, 31a, 30b and 31b transmit different wavelengths of light signals. Each of the repeaters 22a, 22b, 22c and 22d is equipped with an optical amplifier, which amplifies the light signals. The optical receivers 34a, 35a, 34b and 35b receive the light signals having the different wavelengths. Each of the interface units 14a, 14b, 14c and 14d monitors and controls the device that is connected thereto. The simulator 15 performs simulating operation based on estimation parameters of each device detected by the interface units 14a, 14b, 14c and 14d.

The WDMs 32a and 33b at the transmitter side are designed to multiplex light signals supplied from the transmitters 30a and 31a, and 30b and 31b, respectively. On the other hand, the WDMs 33a and 32b at the receiver side are designed to divide the multiplexed light signal supplied from the optical fiber 21c and 21d, respectively. A supervisory signal, shown by a broken line, is wavelength-multiplexed in the optical fibers 21a, 21b, 21c, 21d, 21e and 21f.

As described above, in the wavelength-multiplex transmission system, the supervisory signal is transmitted using wavelength-multiplexing technique, so that each device can be monitored and controlled without a supervisory network.

Eighth Preferred Embodiment

Figure 18:
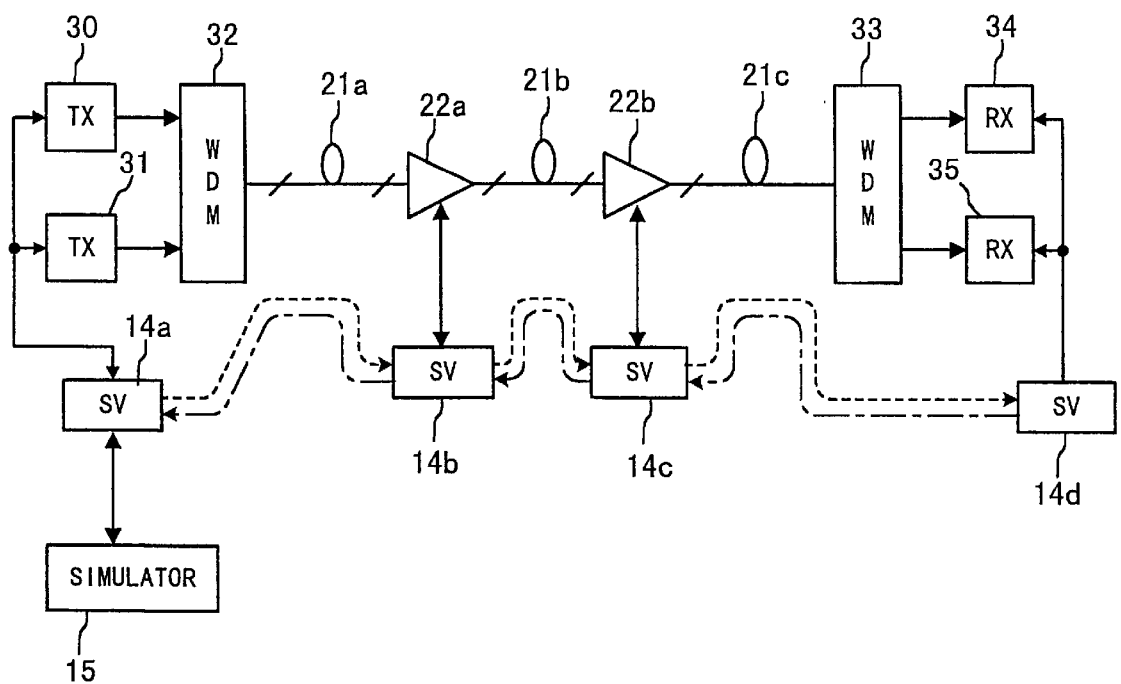
FIG. 18 is a block diagram showing the structure of an optical transmission system and a method for supervising the same, according to an eighth preferred embodiment of the invention.

FIG. 18 shows an optical transmission system using an optical transmission simulator, according to an eighth preferred embodiment of the invention. The same or corresponding components to the sixth and seventh preferred embodiments shown in FIGS. 16 and 17 are indicated by the same reference numerals and symbols.

In FIG. 18, the optical transmission system includes optical transmitters 30 and 31, a WDM (Wavelength Division Multiplexer) 32 at a transmitter side; an optical transmission line including optical fibers 21a, 21b and 21c, repeaters 22a and 22b, a WDM 33 at a receiver side, optical receivers 34 and 35, interface units (SV) 14a, 14b, 14c and 14d, and a simulator 15. The interface unit 14a is connected to the optical transmitters 30 and 31, and to the simulator 15. The interface units 14b and 14c are connected to the repeaters 22a and 22b, respectively. The interface unit 14d is connected to the optical receivers 34 and 35. The interface units 14a, 14b, 14c and 14d are connected to each other by a communication line, such as a telephone line, a supervisory network, etc.

The optical transmitters 30 and 31 transmit different wavelengths of light signals. Each of the repeaters 22a and 22b is equipped with an optical amplifier, which amplifies the light signals. The optical receivers 34 and 35 receive the light signals having the different wavelengths. Each of the interface units 14a, 14b, 14c and 14d monitors and controls the device that is connected thereto. The simulator 15 performs simulating operations based on estimation parameters of each device detected by the interface units 14a, 14b, 14c and 14d.

The WDM 32 at the transmitter side is designed to multiplex light signals supplied from the transmitters 30 and 31 and transmit the multiplexed light signal to the optical fiber 21a. On the other hand, the WDM 33 at the receiver side is designed to divide the multiplexed light signal supplied from the optical fiber 21c and to supply the divided light signals to the optical receivers 34 and 35.

In this embodiment, supervisory signal lights, having the different wavelengths $\lambda 1$ and $\lambda 2$ in upward and downward directions, are transmitted over the common transmission line by two-way transmission using the wavelength multiplexing technique. Therefore, each device can be monitored and controlled using the single transmission line.

Ninth Preferred Embodiment

In the system using wavelength multiplexing technique, such as shown in FIG. 18, when the number of wavelength channels are increased, for example, another optical transmitter (TX) for a different wavelength is added to the system, output levels of the other wavelength channels may be changed and a reciprocal action (four-wave-mixing, cross-talk or the like) may occur.

Accordingly, in the ninth preferred embodiment, when the number of wavelength channels is increased, a level of a signal on each wavelength and the distance between every two wavelengths are monitored. The simulator 15 estimates a bit-error rate or a Q-factor, and controls an output level of each device and a discrimination point of the optical receiver so that the system has the maximum margin.

According to the embodiment, even if the number of wavelength channels is increased after the system has been installed and been in operation, each device can be automatically controlled so that the system operates under the optimum condition.

Tenth Preferred Embodiment

In the system using wavelength multiplexing, such as shown in FIG. 18, when one wavelength channel becomes out of order in the opposite case of the ninth preferred embodiment, output levels of the other wavelength channels may be changed and a reciprocal action (four-wave-mixing, cross-talk or the like) may occur.

Accordingly, in this embodiment, when a system of a wavelength channel becomes out of order, a level of a signal on each wavelength and the distance between every two wavelengths are monitored. The simulator 15 estimates a bit-error rate or a Q-factor, and controls an output level of each device and a discrimination point of the optical receiver so that the system has the maximum margin.

According to the preferred embodiment, even if a system of a wavelength channel becomes out of order during the system is in operation, each device can be automatically controlled so that the system operates under the optimum condition.

Eleventh Preferred Embodiment

Figure 19:
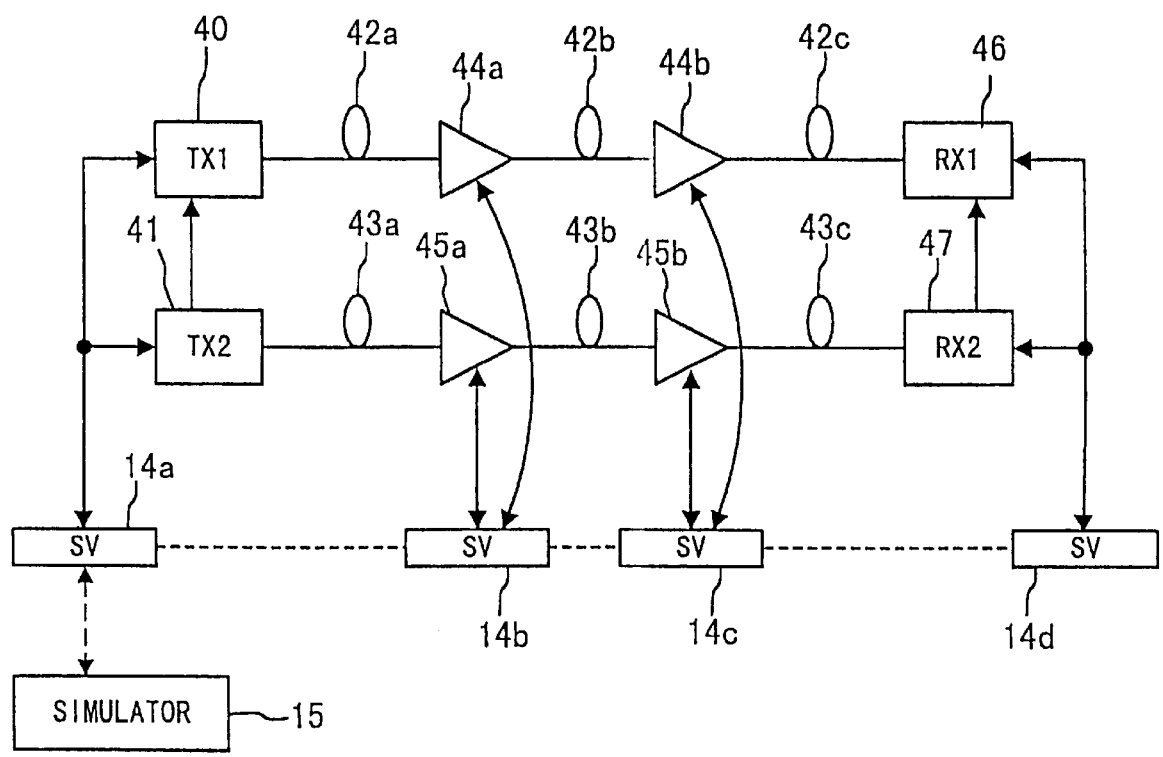
FIG. 19 is a block diagram showing the structure of an optical transmission system and a method for supervising the same, according to an eleventh preferred embodiment of the invention.

FIG. 19 shows the outline of an optical transmission system using an optical transmission simulator, according to an eleventh preferred embodiment of the invention. In this preferred embodiment, the same or corresponding components to the first preferred embodiment, shown in FIG. 1, are indicated by the same reference numerals and symbols.

In FIG. 19, the optical transmission system includes optical transmitters 40 and 41, a first optical transmission line including optical fibers 42a, 42b and 42c, a second optical transmission line including optical fibers 43a, 43b and 43c, repeaters 44a, 44b, 45a and 45b, optical receivers 46 and 47, interface units (SV) 14a, 14b, 14c and 14d, and a simulator 15.

The interface unit 14a is connected to the optical transmitters 30 and 31. The interface unit 14b is connected to the repeaters 44a and 45a. The interface unit 14c is connected to the repeaters 44b and 45b. The interface unit 14d is connected to the optical receivers 46 and 47. The simulator 15 and the interface units 14a, 14b, 14c and 14d are connected to each other by a communication line, such as a telephone line, a supervisory network, etc.

The optical transmitters 40 and 41 transmit different wavelengths of light signals. Each of the repeaters 44a, 44b, 45a and 45b is equipped with an optical amplifier, which amplifies the light signals. The optical receivers 46 and 47 receive the light signals having the different wavelengths. Each of the interface units 14a, 14b, 14c and 14d monitors and controls the devices that are connected thereto. The simulator 15 performs simulating operations based on estimation parameters of each device detected by the interface units 14a, 14b, 14c and 14d.

As shown in FIG. 19, the system of this embodiment includes a pair of optical transmitters (40 and 41), two pairs of optical repeaters (44a–44b and 45a–45b) and a pair of optical receivers (46 and 47). A first transmission circuit may be formed by the optical transmitter (TX1) 40, the optical fibers 42a, 42b and 42c, the repeaters 44a and 44b, and the optical receiver (RX1) 46. A second transmission circuit may be formed by the optical transmitter (TX2) 41, the optical fibers 43a, 43b and 43c, the repeaters 45a and 45b, and the optical receiver (RX2) 47. The devices (40–47) can be selected to form a suitable combination of transmission circuit.

As mentioned in the description of the first preferred embodiment, the system margin generally depends on an extinction ratio of the optical transmitter, an NF (Noise Figure) of the optical repeater, a Q-factor of the optical receiver, and so on. As the devices (40–47) can be selected to form a suitable combination of transmission circuit in this embodiment, the system margin can be optimized easily even if some devices do not work well.

For example, even if the optical receiver has an undesirable Q-factor, the transmission system can be controlled to have an allowable system margin by selecting an optical transmitter having a preferable extinction ratio. In contrast, if both the optical transmitter and the optical receiver have undesirable characteristics, each device can not have enough margin, although the system margin may be in the allowable range. Consequently, to obtain a total preferable system margin, the average of the margin for the devices should be constant.

Accordingly, in this embodiment, the simulator 15 selects the combination of devices, forming the transmission system, so as to obtain the maximum system margin in total. As a result, it is possible to secure a large range of system margin in total.

Twelfth Preferred Embodiment

Figure 20:
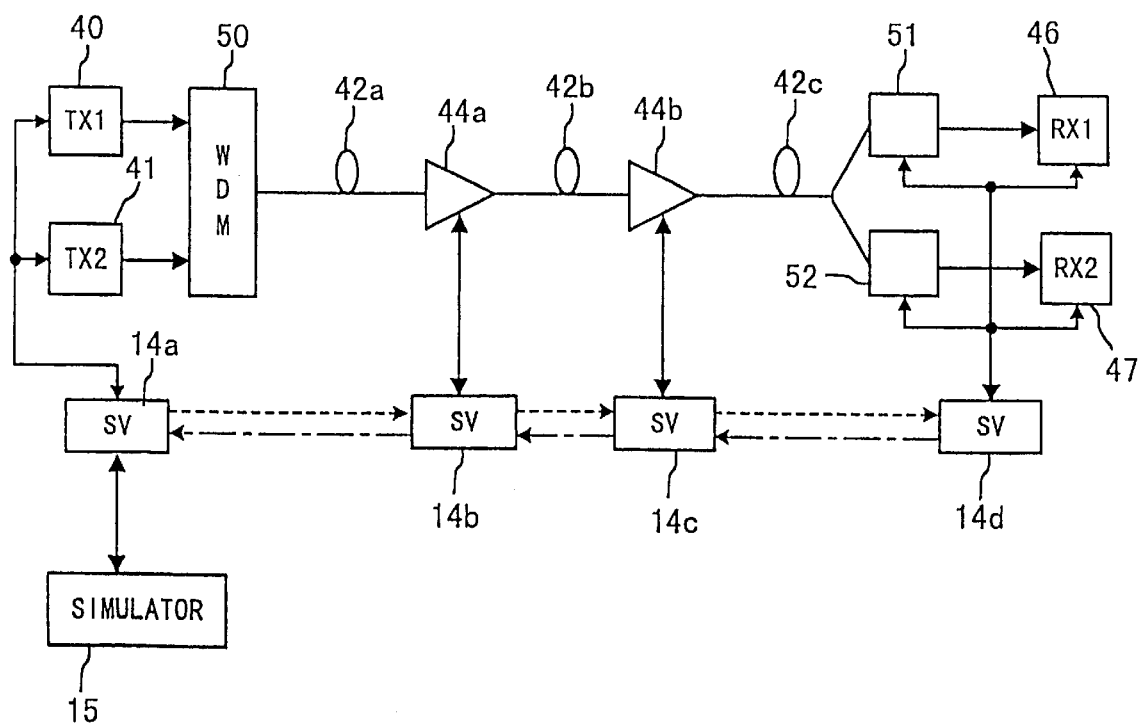
FIG. 20 is a block diagram showing the structure of an optical transmission system and a method for supervising the same, according to a twelfth preferred embodiment of the invention.

FIG. 20 shows the outline of an optical transmission system using an optical transmission simulator, according to a twelfth preferred embodiment of the invention. In this preferred embodiment, the same or corresponding components to the eleventh preferred embodiment, shown in FIG. 19, are indicated by the same reference numerals and symbols.

In FIG. 20, the optical transmission system includes optical transmitters 40 and 41, a WDM (Wavelength Division Multiplexer) 50 at a transmitter side; an optical transmission line including optical fibers 42a, 42b and 42c, repeaters 44a and 44b, optical switches or optical tunable filters 51 and 52; optical receivers 46 and 47, interface units (SV) 14a, 14b, 14c and 14d, and a simulator 15.

The interface unit 14a is connected to the optical transmitters 40 and 41, and to the simulator 15. The interface units 14b and 14c are connected to the repeaters 44a and 44b, respectively. The interface unit 14d is connected to the optical switches (optical tunable filters) 51 and 52 and to the optical receivers 46 and 47. The interface units 14a, 14b, 14c and 14d are connected to each other by a communication line, such as a telephone line, a supervisory network, etc.

The optical transmitters 40 and 41 transmit different wavelengths of light signals. Each of the repeaters 44a and 44b is equipped with an optical amplifier, which amplifies the light signals. The optical receivers 46 and 47 receive the light signals having the different wavelengths. Each of the interface units 14a, 14b, 14c and 14d monitors and controls the device(s) that is (are) connected thereto. The simulator 15 performs simulating operations based on estimation parameters of each device detected by the interface units 14a, 14b, 14c and 14d.

The WDM 50 is designed to multiplex light signals supplied from the transmitters 40 and 41 and transmit the multiplexed light signal to the optical fiber 42a. Each of the optical switches (or optical tunable filters) 51 and 52 is designed to switch a light signal supplied from the optical fiber 42c. The interface unit 14d controls the optical switches (or optical tunable filters) 51 and 52 and the optical receivers (RX1 and RX2) 46 and 47 to switch them selectively.

The light signal supplied from the optical transmitters (TX1 and TX2) 40 and 41 are multiplexed by the WDM 50, then transmitted via the optical fibers 42a–42c and the repeaters 44a and 44b to the optical switches (or optical tunable filters) 51 and 52. At the optical switches (or optical tunable filters) 51 and 52, the transmitted light signal is selectively supplied to one of the optical receivers (RX1 and RX2) 46 and 47.

In the above-described transmission system, each device is selected and controlled by using the optical switches (or optical tunable filters) 51 and 52, so that necessary components (devices) can be automatically selected and combined to establish the suitable network that provides the maximum system margin in total.

Thirteenth Preferred Embodiment

Figure 21:
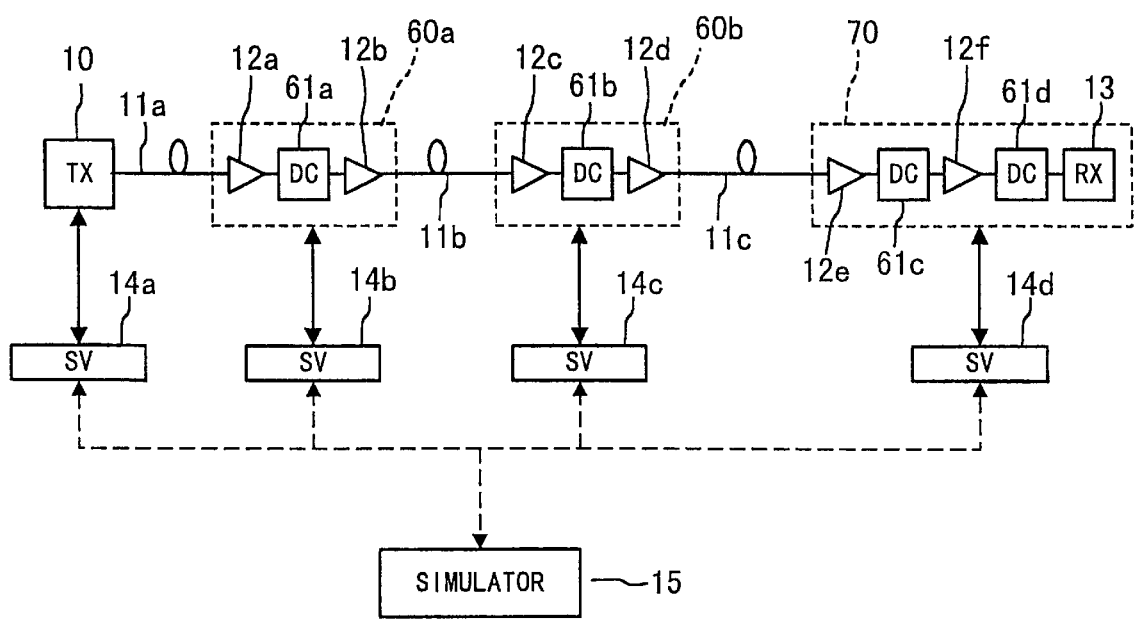
FIG. 21 is a block diagram showing the structure of an optical transmission system and a method for supervising the same, according to a thirteenth preferred embodiment of the invention.

FIG. 21 shows the outline of an optical transmission system using an optical transmission simulator, according to a thirteenth preferred embodiment of the invention. In this preferred embodiment, the same or corresponding components to the first preferred embodiment, shown in FIG. 1, are indicated by the same reference numerals and symbols.

In FIG. 21, the optical communication system includes an optical transmitter (TX) 10; an optical transmission line, including optical fibers 11a, 11b and 11c; repeater units 60a and 60b; an optical receiver unit 70; interface units (SV) 14a, 14b, 14c and 14d; and a simulator 15. Each device is supervised via the simulators 15 (SV) 14a, 14b, 14c and 14d based on the calculations of the simulator 15.

The optical fiber 11a connects the optical transmitter 10 to the repeater unit 60a. The optical fiber 11b connects the repeater units 60a and 60b to each other. The optical fiber 11b connects the repeater unit 60b to the optical receiver unit 70. The interface units 14a, 14b, 14c and 14d are respectively connected to the optical transmitter 10, the repeater unit 60a, the repeater unit 60b and the optical receiver unit 70.

The repeater unit 60a includes optical amplifiers 12a and 12b, and a DC (Dispersion Compensator) 61a, connected between the optical amplifiers 12a and 12b. The repeater unit 60b includes optical amplifiers 12c and 12d, and a DC (Dispersion Compensator) 61b, connected between the optical amplifiers 12c and 12d. The optical receiver unit 70 includes optical amplifiers 12e and 12f, an optical receiver (RX) 13 and dispersion compensators 61c and 61d. The dispersion compensator 61c is connected between the optical amplifiers 12e and 12f, and the dispersion compensator 61d is connected between the optical amplifiers 12f and the optical receiver 13.

Each of the interface units 14a, 14b, 14c and 14d monitors and controls the device connected thereto. The simulator 15 performs simulating operations based on estimation parameters of each device detected by the interface units (SV) 14a, 14b, 14c and 14d. The interface units 14a, 14b, 14c and 14d and the simulator 15 are connected to each other by a communication line, shown by broken lines, such as a telephone line, a supervisory network, etc.

The optical transmitter 10 transmits a wavelength-multiplexed light signal. Each of the dispersion compensators 61a, 61b, 61c and 61d is designed to compensate for wavelength distribution of the optical fibers. The simulator 15 controls each compensator via the interface unit.

In the optical receiver unit 70, the optical amplifiers 12e and 12f amplify the light signal supplied from the optical transmitter 10. Each of the dispersion compensators (DC) 61c and 61d compensates for transmission loss in the optical fibers 11a, 11b and 11c and in the dispersion compensators 61a and 61b.

The optical transmission system of this embodiment is established by adding the dispersion compensators (DC) 61a, 61b, 61c and 61d, which compensate for wavelength dispersion in the optical fibers 11a, 11b and 11c, to the optical repeater and optical receiver (RX) 13 of the first preferred embodiment, shown in FIG. 1. In this embodiment, shown in FIG. 21, each of the dispersion compensators (DC) 61a, 61b, 61c and 61d is built-in each optical amplifier of the optical repeaters 60a and 60b, and the optical receiver unit (RX) 70.

Figure 22:
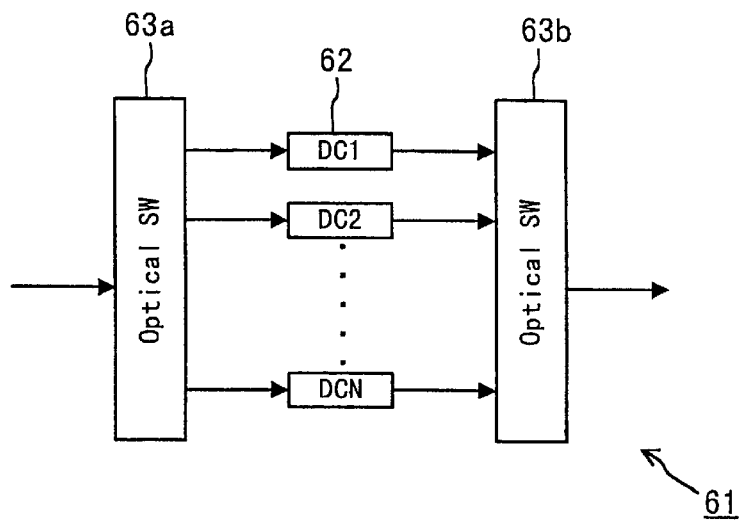
FIG. 22 is a block diagram showing the structure of a dispersion compensator (DC) used in the optical transmission system and the method for supervising the same, according to the thirteenth preferred embodiment.

FIG. 22 shows the structure of the dispersion compensator (DC) 61a. The other DCs 61b, 61c and 61d have the same structure as the DC 61a. In FIG. 22, the dispersion compensator (DC) 61a is composed of a plurality of dispersion compensator elements 62 (DC1, DC2, ..., DCN) and optical switches 63a and 63b, which select one of the dispersion compensator elements 62 (DC1, DC2..., DCN).

In general, as a transmission line fiber, two kinds of fibers are used. One of them is a DSF (Dispersion Shift Fiber) having a wavelength dispersion of around zero (±3.5 ps/nm/km) at a wavelength of 1.55 μm, and the other one is an SMF (Single Mode Fiber) having a larger wavelength dispersion (16 to 20 ps/nm/m) at a wavelength of 1.55 μm. In this embodiment, the SMFs are employed. In the case where the SMFs are used, a dispersion compensator is usually used for compensating wavelength dispersion of the fiber.

In practice, as a wavelength dispersion varies from fiber to fiber, the dispersion compensator connected thereto is not always best for the transmission fiber. The dispersion compensators (DC) 61a, 61b, 61c and 61d, shown in FIG. 21, can be controlled via the interface units (SV) 14a, 14b, 14c and 14d, so that the dispersion of each optical fiber can always be compensated under the optimum condition. For controlling the compensation rate, for example, as shown in FIG. 22, the optical switches 63a and 63b select one of the dispersion compensator elements 62 (DC1, DC2, . . . , DCN).

As another way for controlling the compensation rate, for example, a PLC (Planar Lightwave Circuit) can be used, which is described in "Dispersion Compensation Test using PLC type of Light Compensation Equator," C-337, 1994 Electro-Communication Society Spring Conference.

As described above, in the optical transmission system, according to the thirteenth preferred embodiment, the compensation rate of each dispersion compensator (DC) is controlled via the interface units (SV) 14a, 14b, 14c and 14d based on the calculation result of the simulator 15. As a result, it is possible to maximize the bit-error rate or minimize Q-factor so as to obtain the maximum system margin.

This embodiment is also useful for an optical transmission system using the DSF type of optical fibers, because the DSF has a variation of wavelength dispersion around zero level. In other words, it is possible to obtain the maximum system margin when the compensation rates of the dispersion compensators are controlled properly.

Fourteenth Preferred Embodiment

Figure 23:
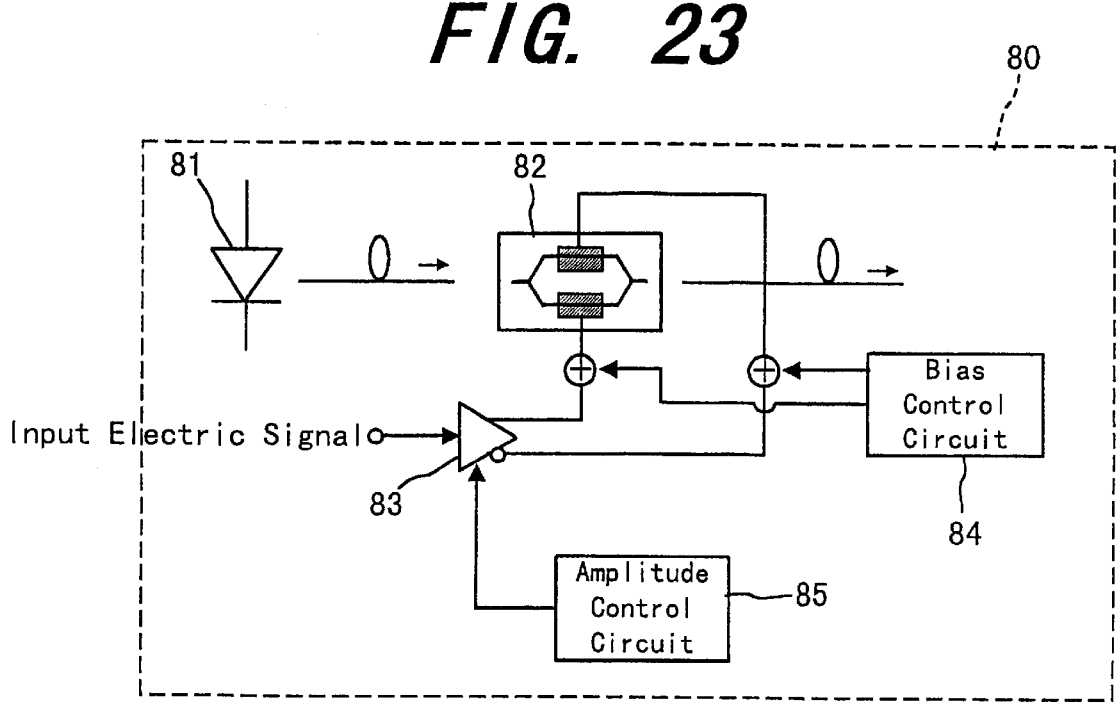
FIG. 23 is a block diagram showing the structure of an optical transmission system and a method for supervising the same, according to a fourteenth preferred embodiment of the invention.

FIG. 23 shows the structure of an optical transmitter 80 in an optical transmission system using an optical transmission simulator, according to a fourteenth preferred embodiment of the invention. This embodiment is established by adding a function for controlling a chirp parameter (showing a variation of the wavelength of a light source) to the optical transmission system according to the first preferred embodiment shown in FIG. 1, or the eighth preferred embodiment shown in FIG. 18. The details of the controlling operation have been described, for instance, in the report of "High-speed, low power optical modulator with adjustable chirp parameter," by S. K Korotky et al., Integrated Photonics Research 1991, TuG2, pp.53–54. The fourteenth embodiment will be described in accordance with this publication.

In FIG. 23, the optical transmitter includes a semiconductor laser 81 as a light source, an optical modulator 82, an optical modulator driving circuit 83, a bias control circuit 84 and an output amplitude control circuit 85. The semiconductor laser 81, such as a DFB laser (Distributed Feedback Laser), supplies a light signal having a specific wavelength. The optical modulator 82 is of a Mach-Zehnder type, which amplitude-modulates light supplied from the semiconductor laser 81.

The optical modulator driving circuit 83 drives the optical modulator 82. The optical modulator driving circuit 83 is supplied with an input electric signal to generate output signals having the opposite logical levels to be supplied to electrodes of the optical modulator 82. The bias control circuit 84 controls a bias voltage to be applied to each electrode of the optical modulator 82. The output amplitude control circuit 85 independently controls the amplitudes of modulating waves to be supplied to the electrodes of the optical modulator 82.

As described above, according to the optical transmitter 80 of this embodiment, a wavelength chirp level can be controlled by an outside circuit.

In general, when a dispersion rate D (ps/nm) of an optical fiber is positive, the waveform of the transmitted light becomes broader. In the opposite case, the waveform of the transmitted light becomes narrower. Such phenomenon occurs in the case where the chirp parameter $\alpha$ of the light source is positive ($0<\alpha$). On the other hand, when the chirp parameter $\alpha$ is negative ($\alpha<0$), the dispersion D of the optical fiber has the opposite characteristics.

Figure 24:
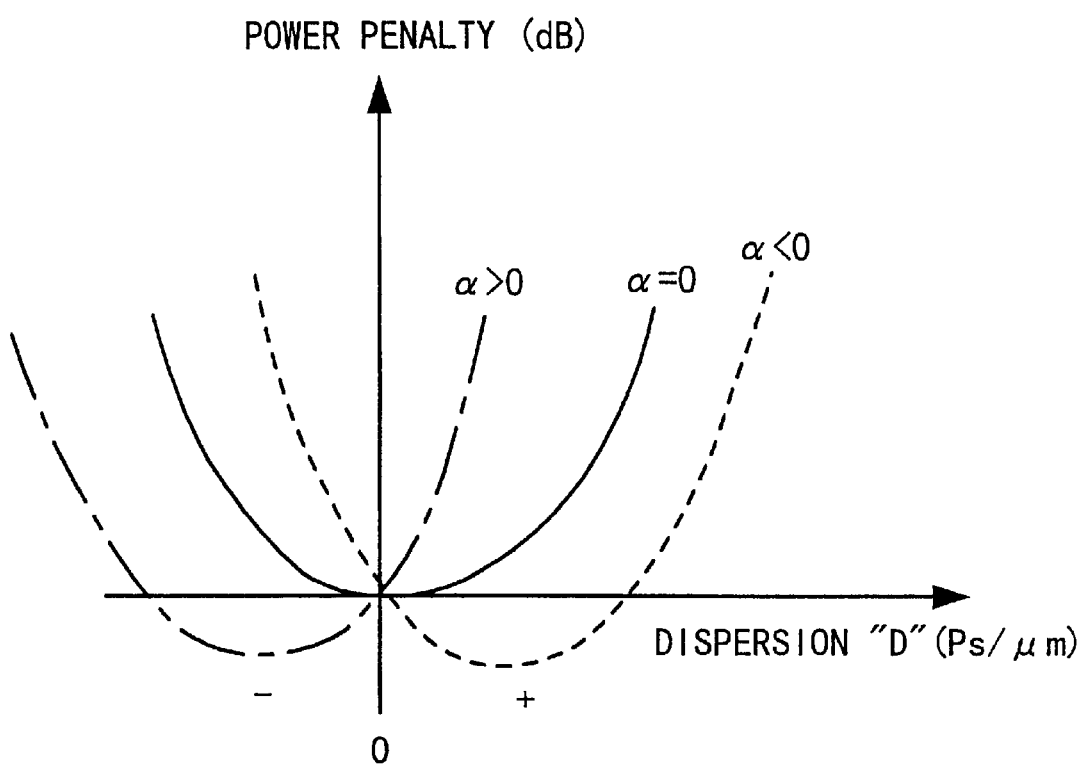
FIG. 24 is a graph showing the dependency of the power penalty on a dispersion degree D using a chirp coefficient $\alpha$ as a parameter, in the optical transmission system and the method for supervising the same, according to the fourteenth preferred embodiment.

FIG. 24 shows the variation of power penalty relative to the variation of dispersion "D" for each condition of the chirp parameter $\alpha$. For example, when the chirp parameter $\alpha$ is zero, the dispersion D is increased due to a widened waveform and the power penalty is increased generally as well. However, if the chirp parameter $\alpha$ is controlled to meet the condition of $\alpha<0$, the waveform is narrowed to make the power penalty lower. On the other hand, if the dispersion D becomes D<0, the waveform is narrowed by influences both of the dispersion of the transmission line and the chirp parameter, so that the power penalty is increased rapidly.

Accordingly, the optical transmission system of this embodiment, the chirp parameter $\alpha$ of the optical transmitter 80 is controlled by the outside circuit so as to optimize the waveform of the received signal.

Referring again to FIG. 23, an output light of the semiconductor laser 81 is supplied to the optical modulator 82 and is modulated in amplitude. The optical modulator 82 of Mach-Zehnder type controls the phases of the divided two light signals with a voltage to change the degree of interference so that the amplitude modulation is performed. The optical modulator 82 is supplied at the electrodes with the output signals of the optical modulator driving circuit 83, which has the opposite logical characteristics, so that the amplitude of each signal is controlled by the output amplitude control circuit 85. Further, the bias control circuit 84 controls a bias voltage applied to each electrode of the optical modulator 82. Thus, the chirp parameter a is well controlled.

According to the fourteenth preferred embodiment, the chirp parameter of the semiconductor laser 81 is controlled to optimize the waveform of the received signal, and therefore, the maximum system margin is obtained.

Fifteenth Preferred Embodiment

Figure 25:
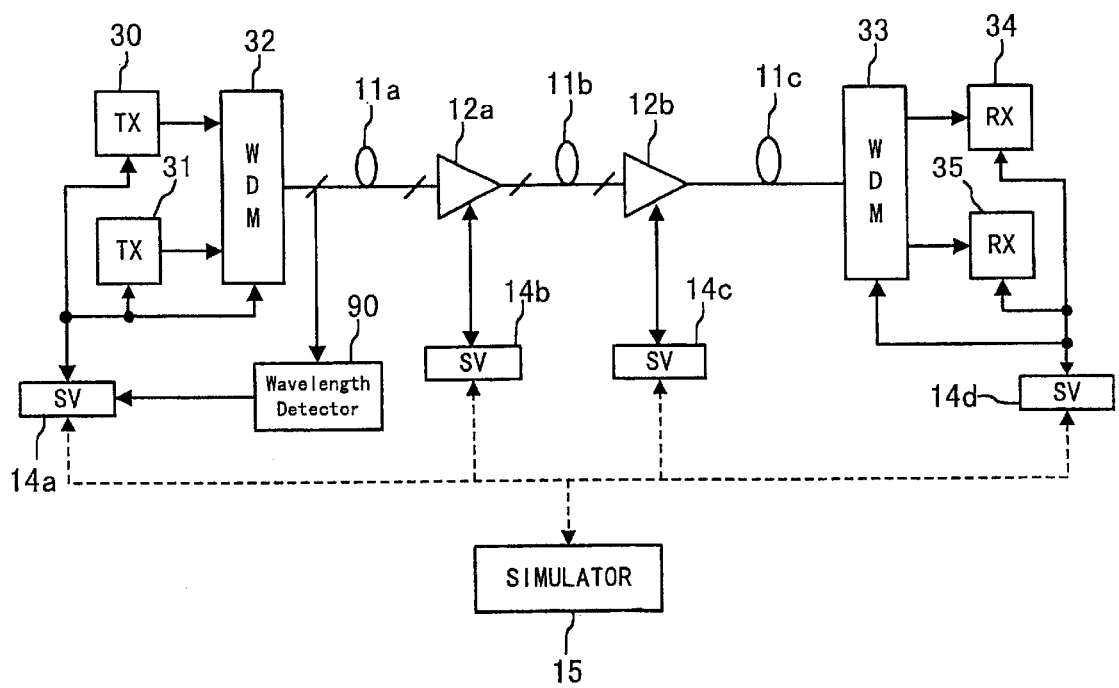
FIG. 25 is a block diagram showing the structure of an optical transmission system and a method for supervising the same, according to a fifteenth preferred embodiment of the invention.

FIG. 25 shows the outline of an optical transmission system using an optical transmission simulator, according to a fifteenth preferred embodiment of the invention. In this preferred embodiment, the same or corresponding components to the sixth preferred embodiment, shown in FIG. 16, are indicated by the same reference numerals and symbols.

In FIG. 25, the optical transmission system includes optical transmitters 30 and 31, a WDM (Wavelength Division Multiplexer) 32 at a transmitter side; an optical transmission line, including optical fibers 11a, 11b and 11c, repeaters 12a and 12b, a WDM 33 at a receiver side, optical receivers 34 and 35, interface units (SV) 14a, 14b, 14c and 14d; a simulator 15; and a wavelength detector 90.

The interface unit 14a is connected to the optical transmitters 30 and 31, the WDM 32 and the wavelength detector 90. The interface units 14b and 14c are connected to the repeaters 12a and 12b, respectively. The interface unit 14d is connected to the optical receivers 34 and 35 and the WDM 33. Each of the interface units 14a, 14b, 14c and 14d is connected to the simulator 15 by a communication line, such as a telephone line, a supervisory network etc.

The optical transmitters 30 and 31 transmit different wavelengths of light signals. Each of the repeaters 12a and 12b is equipped with an optical amplifier, which amplifies the light signals. The optical receivers 34 and 35 receive the light signals having the different wavelengths. Each of the interface units 14a, 14b, 14c and 14d monitors and controls the device that is connected thereto. The simulator 15 performs simulating operations based on estimation parameters of each device detected by the interface units 14a, 14b, 14c and 14d. The wavelength detector 90 detects and collects the wavelength of each signal transmitted through the optical fiber 11a.

The WDM 32 at the transmitter side is designed to multiplex light signals supplied from the transmitters 30 and 31 and to transmit the multiplexed light signal to the optical fiber 11a. On the other hand, the WDM 33 at the receiver side is designed to divide the multiplexed light signal supplied from the optical fiber 11c and supply the divided light signals to the optical receivers 34 and 35.

The optical transmission system of this embodiment is formed by adding the wavelength detector 90, which measures the light spectrum of a transmitted light and detects its wavelength, to the above mentioned optical transmission system, shown in FIG. 16. Output data of the wavelength detector 90 are collected by the simulator 15 via the interface unit (SV) 14a. The transmission side WDM 32 is designed to control the wavelengths of signals supplied from the transmitters (TX) 30 and 31.

In general, when a plurality of signals having different wavelengths are transmitted over a single transmission line, a so-called four-wave-mixing of a non-linear phenomenon is generated in the transmission line. This phenomenon is remarkable when a DSF (Dispersion Shift Fiber), having a wavelength dispersion around zero, is employed as the transmission line. As a result, a light having an undesirable wavelength enters into the main signal, and therefore, the transmission characteristics of the system are remarkably deteriorated (Reference: Communication System Study Group of Communication Society CS96-43).

Accordingly, it is required to control the wavelengths of signals to be transmitted through the same optical fiber so that an undesirable wavelength of signal does not enter into the wavelength of the main signal. However, even if the wavelengths are adjusted when the system is installed, the four-wave-mixing phenomenon may occurs, because the wavelengths of the transmission signals are later changed to ensure a high system margin and/or the wavelengths may be changed with time after the installation of the system.

In this embodiment, the wavelength detector 90 detects the wavelengths of the transmission lights, and the detected data are supplied to the simulator 15 via the interface unit 14a. The simulator 15 calculates the condition of the wavelengths of the signal lights so as not to generate the four-wave-mixing. In response to the calculation result, the simulator 15 controls the wavelengths of lights traveling through the optical fibers 11a, 11b and 11c.

As described above, according to the fifteenth preferred embodiment, the wavelength detector 90 detects and collects the wavelength of each signal. The detected data are supplied to the simulator 15 via the interface unit 14a. The simulator 15 calculates a wavelength that does not generate the four-wave-mixing, and controls the wavelength of each transmission signal to be approximate to the calculated optimum wavelength. Therefore, even if the wavelengths of the signal lights are changed after the installation of the system, the maximum system margin can be obtained.

Sixteenth Preferred Embodiment

Figure 26:
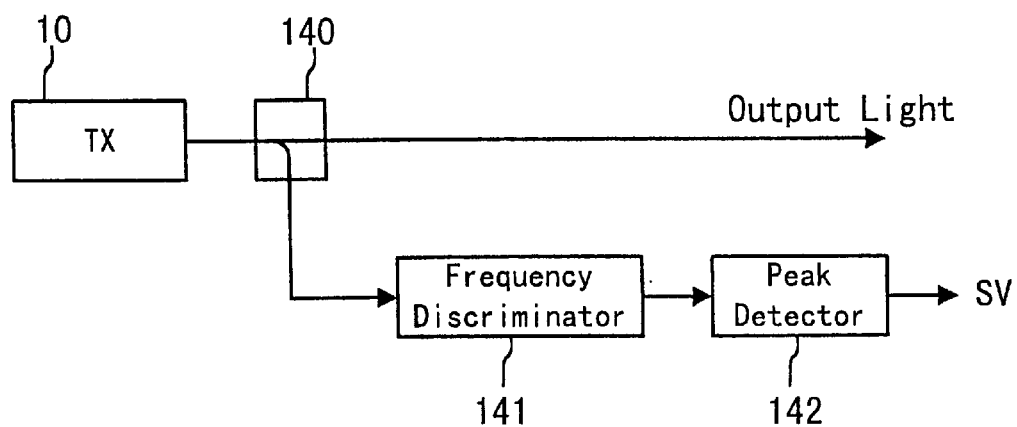
FIG. 26 is a block diagram showing the structure of an optical transmission system and a method for supervising the same, according to a sixteenth preferred embodiment of the invention.

FIG. 26 shows the structure of an optical transmission system using an optical transmission simulator, according to a sixteenth preferred embodiment of the invention. In this preferred embodiment, the same or corresponding components to the first preferred embodiment, shown in FIG. 1, are indicated by the same reference numerals and symbols.

Modifying the above mentioned optical transmission system of the first preferred embodiment, forms this preferred embodiment, in which a wavelength chirp level of an optical transmitter is monitored. As the wavelength chirp level corresponds to variation of the light frequency, hereinafter, the chirp level is referred to as the light frequency variation for easier understanding.

In FIG. 26, a reference numeral 140 indicates an optical coupler, which divides an output signal of an optical transmitter 10; a reference numeral 141 indicates an optical frequency discriminator; and a reference numeral 142 indicates a peak detector, the output of which is supplied to an interface unit SV (not shown).

The optical coupler 140 divides the output light of the optical transmitter 10 based on its wavelength and direction, and supplies the divided signal to an optical fiber and to the optical frequency discriminator 141.

Figure 27:
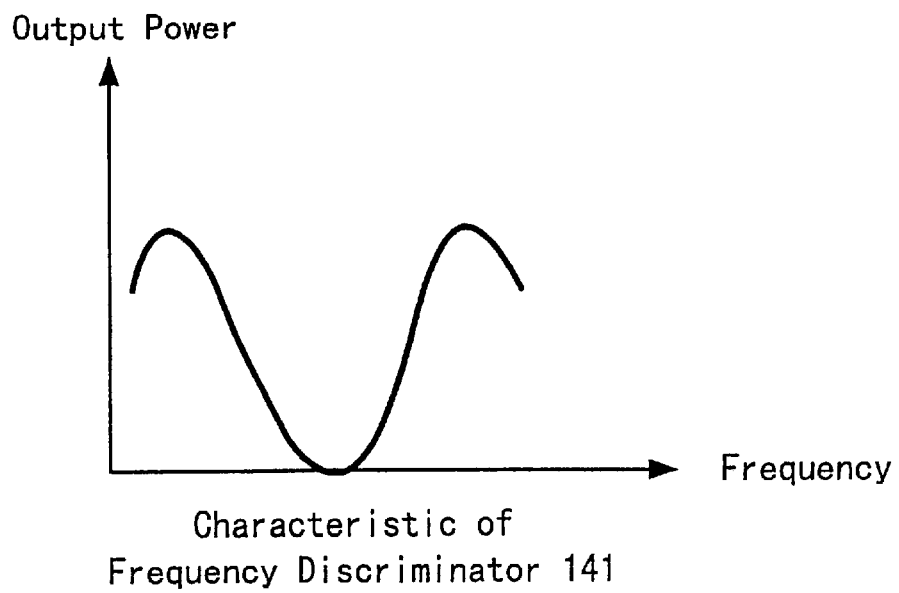
FIG. 27 is a graph showing the discrimination characteristic of a frequency discriminator in the optical transmission system and the method for supervising the same, according to the sixeenth preferred embodiment.

The optical frequency discriminator 141 may be formed by a Mach-Zehnder interferometer, which has the discrimination characteristic, shown in FIG. 27. As shown in FIG. 27, the output power varies in response to the optical frequency of a signal light, so that the frequency of the light can be discriminated from the peak voltage.

The peak detector 142 detects the peak of the output signal of the optical frequency discriminator 141 and supplies the detected value to the interface unit (SV) as the peak value of the frequency variation.

Next, the operation of the above constructed optical transmission system and of a method for supervising the same will be described. The output light from the optical transmitter 10 is divided by the optical coupler 140 into two lights, one of which is supplied to the optical fiber 11 and the other one is supplied to the optical frequency discriminator 141. The optical frequency discriminator 141 performs frequency discrimination to the input light in accordance with the discrimination characteristic, shown in FIG. 27. The output voltage of the optical frequency discriminator 141 is supplied via the peak detector 142 to the interface unit (SV).

Figure 28:
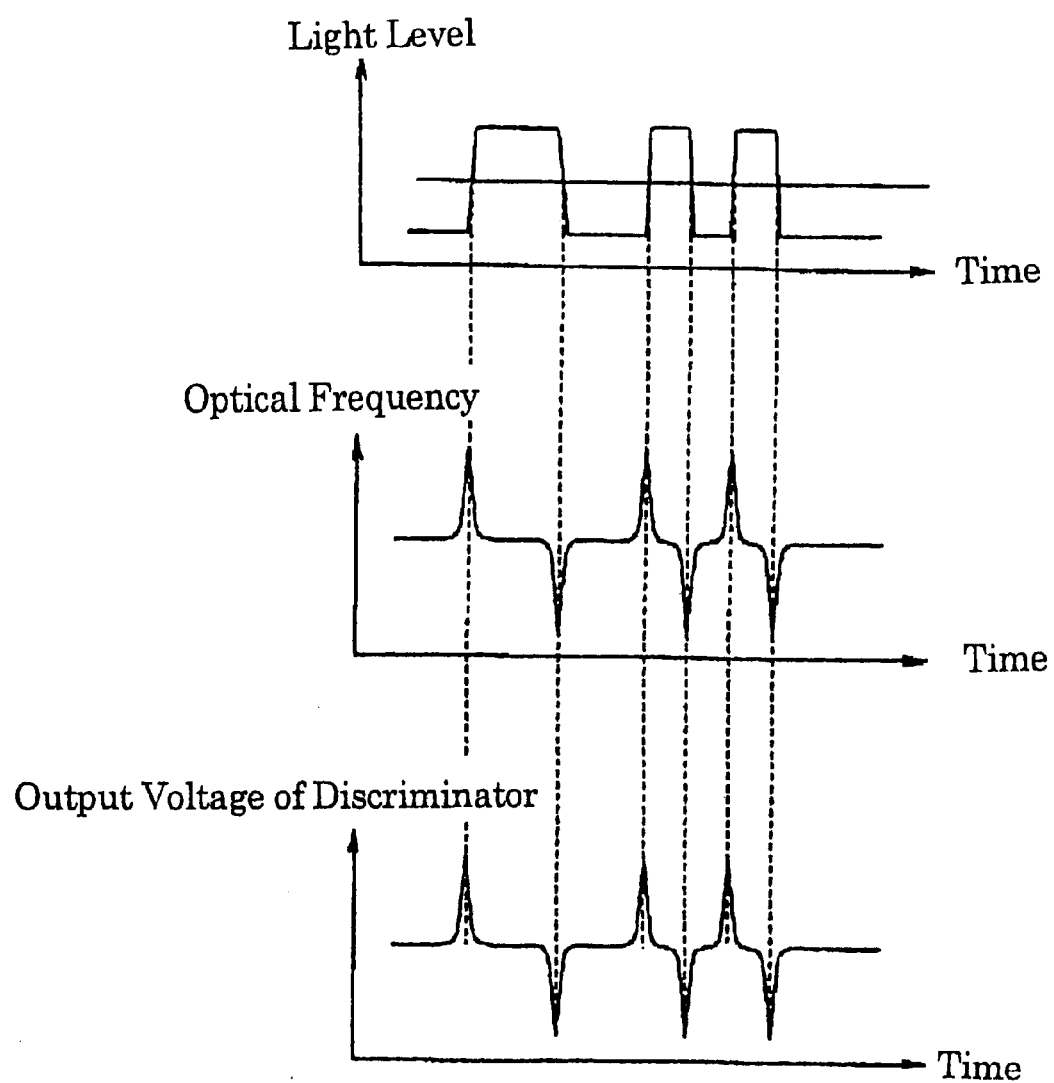
FIG. 28 is a waveform diagram used for explaining the operation of the optical transmission system and the method for supervising the same, according to the sixteenth preferred embodiment.

FIG. 28 shows waveform diagrams, used for describing the operation of this embodiment. The graph shows an optical frequency of the input signal and the output voltage of the optical frequency discriminator relative to a pulse waveform of the input signal.

In general a variation $\Delta f$ of the optical frequency is calculated from the following equation (1) based on an optical pulse waveform $S(t)$, its differentiated value and above-mentioned chirp parameter $\alpha$:

$$\Delta f = (\alpha/4\pi) \times (1/S(t)) \times (dS(t)/dt). \tag{1}$$

According to the equation (1), when the chirp parameter $\alpha$ is greater than zero ($\alpha > 0$), the optical frequency changes in the opposite polarities (codes) as differentiated pulses at points where the level of the pulse waveform starts rising up and falling down, as shown in FIG. 28. The frequency discriminator 141 supplies an output signal having a pulse waveform that is almost proportional to the variation of the optical frequency. The peak detector 142 detects the peak point of the output waveform of the frequency discriminator 141, so that the peak value of the frequency variation of the transmitted light signal.

In the simulator, an optical pulse waveform is formed in response to the variation of the optical frequency as a phase variation. As understood from the equation (1), actually detecting the frequency variation is equivalent to calculating the frequency variation from the chirp parameter a and the optical pulse waveform. The frequency variation, however, can be monitored more precisely by the actual detection. In this preferred embodiment, the chirp parameter can be monitored.

As explained above, according to the sixteenth preferred embodiment, The chirp quantity, which correlates to the frequency variation, is monitored via the interface unit (SV) 14. In other words, the chirp parameter is monitored by monitoring the frequency variation based on the waveform of the output light supplied from the optical transmitter 10. Therefore, the simulator 15 can calculate (estimate) an error rate and a bit-error rate of the optical receiver in accordance with the chirp parameter.

Seventeenth Preferred Embodiment

Figure 29:
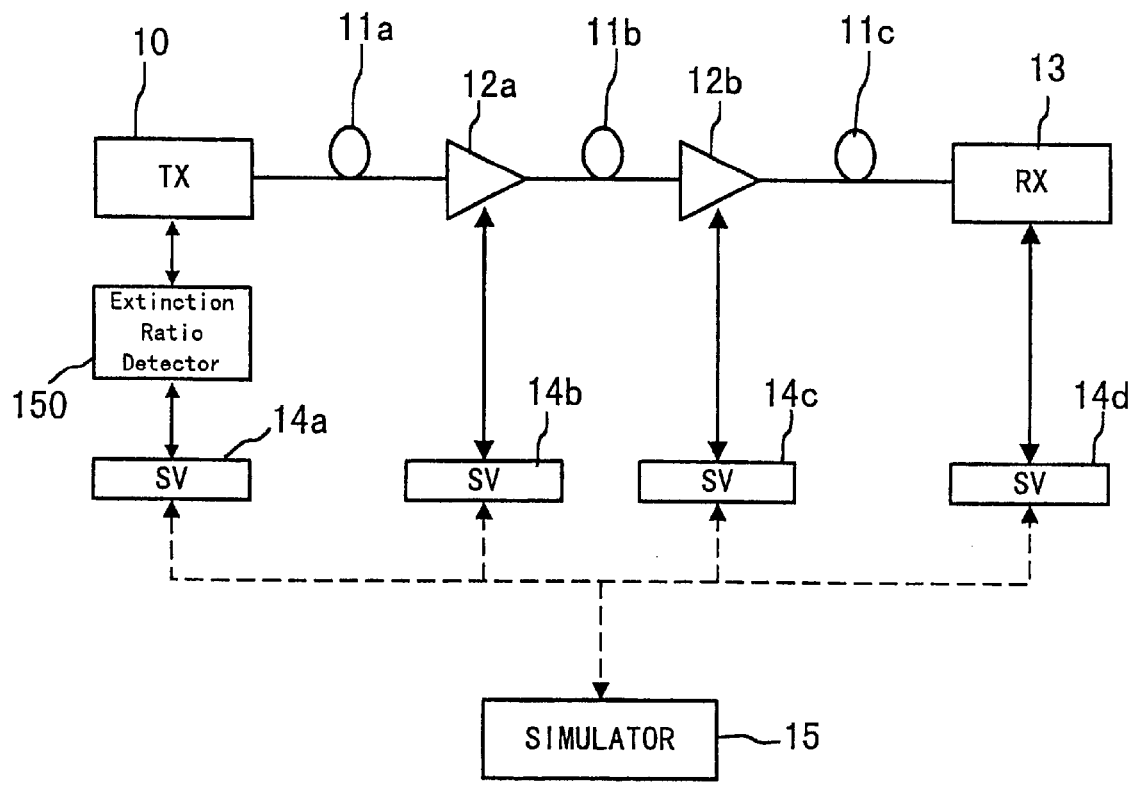
FIG. 29 is a block diagram showing the structure of an optical transmission system and a method for supervising the same, according to a seventeenth preferred embodiment of the invention.

FIG. 29 is a diagram showing the structure of an optical transmission system using an optical transmission simulator, according to a seventeenth preferred embodiment of the invention. In this preferred embodiment, the same or corresponding components to the first preferred embodiment, shown in FIG. 1, are indicated by the same reference numerals and symbols.

Modifying the above mentioned optical transmission system of the first preferred embodiment, shown in FIG. 1, forms this preferred embodiment, in which an extinction ratio of an optical transmitter is detected and monitored. The extinction ratio represents a ratio between light levels in non-emission condition and an emission condition.

In FIG. 29, the optical transmission system includes an optical transmitter (TX) 10, optical fibers 11a, 11b and 11c, repeaters 12a and 12b, an optical receiver (RX) 13, interface units 14a, 14b, 14c and 14d, an optical simulator 15 and an extinction ratio detector 150. Each of the repeaters 12a and 12b is equipped with an optical amplifier, which amplifies a light signal. The optical fiber 11a connects the optical transmitter 10 and the repeater 12a. The optical fiber 11b connects repeaters 12a and 12b. The optical fiber 11c connects the repeater and the optical receiver 13.

The interface units 14a, 14b, 14c and 14d are connected to the extinction ratio detector 150, the repeater 12a, the repeater 12b and the optical receiver 13, respectively. Each of the interface units (SV) 14a, 14b, 14c and 14d monitors and controls each device connected thereto. The simulator 15 is connected to the interface units 14a, 14b, 14c and 14d with a communication line, such as a telephone line, a supervisory network, etc. The simulator 15 simulates the operation of the system based on information from the interface units (SV) 14a, 14b, 14c and 14d.

The optical transmitter (TX) 10 converts an electric signal into a light signal having a specific wavelength, and transmits it to the repeater 12a via the optical fiber 11a.

Figure 30:
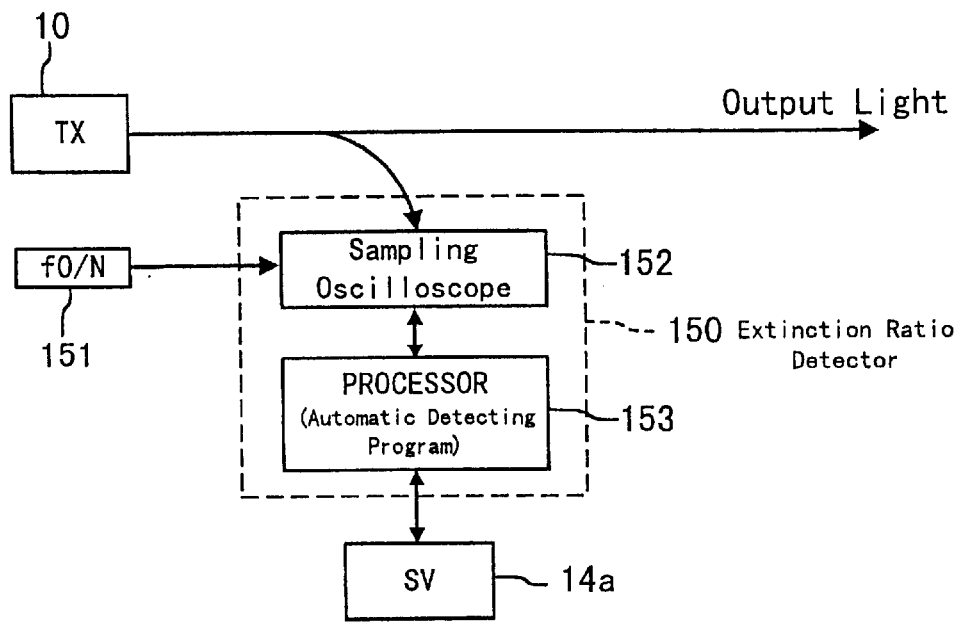
FIG. 30 is a block diagram showing the detailed structure of an extinction ratio detector in the optical transmission system and the method for supervising the same, according to the seventeenth preferred embodiment.

FIG. 30 is a block diagram illustrating the detailed structure of the above-mentioned extinction ratio detector 150. In FIG. 30, the extinction ratio detector 150 includes a sampling oscilloscope 152, provided with an O/E converter; and a processor 153, which detects an extinction ratio using an automatic detecting program. The sampling oscilloscope 152 is supplied with a divided clock signal (f0/N), generated in the optical transmitter 10, as a trigger in order to receive a part of the output light supplied from the optical transmitter 10. The processor 153 is connected to the interface unit 14a.

The sampling oscilloscope 152 and the processor 153 form the extinction ratio detector 150 as a whole to supply the detected extinction ratio to the interface unit (SV) 14a.

In the optical transmission system, each device is supervised via the interface unit (SV) 14a (14b, 14c and 14d) in accordance with the calculation result of the simulator 15. In the optical transmitter 10, the extinction ratio detector 150 detects and monitors the extinction ratio of the waveform of the output signal light supplied from the optical transmitter 10.

In the sampling oscilloscope 152, the O/E converter converts the received light signal into a corresponding electric signal to be supplied to the automatic detecting program processor 153. The automatic detecting program processor 153 detects an extinction ratio of the output light signal at regular intervals in accordance with the automatic detecting program, and supplies the extinction ratio to the interface unit (SV) 14a.

In more detail, the extinction ratio detector 150 measures the average (A) of light levels in an emission mode and the average (B) of light levels in a non-emission mode. The extinction ratio is calculated by the following equation (2):

$$\text{Extinction Ratio [dB]}=10 \log (A/B) \quad (2)$$

The detecting operation of the sampling oscilloscope 152 is carried out in accordance with the automatic detecting program, which is easily formed from conventional application software.

Figure 31:
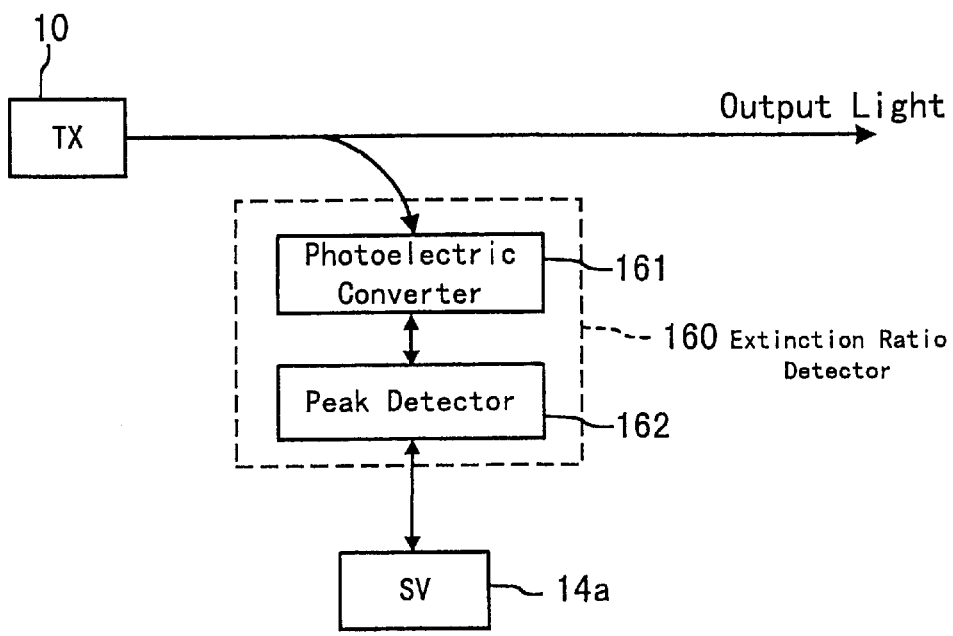
FIG. 31 is a block diagram showing the detailed structure of another extinction ratio detector in the optical transmission system and the method for supervising the same, according to the seventeenth preferred embodiment.

Instead of the extinction ratio detector 150, another type of extinction ratio detector 160, shown in FIG. 31, can be used.

FIG. 31 is a block diagram showing the detailed structure of the extinction ratio detector 160. In FIG. 31, the extinction ratio detector 160 includes a photoelectric (O/E) converter 161 and a peak detector 162, instead of the sampling oscilloscope 152 and the processor 153, used in the extinction ratio detector 150. The peak detector 162 can have the same structure as the peak detector shown in FIG. 26.

In the extinction ratio detector 160, a high level point (A) and a low level (B) of an output light signal supplied from the optical transmitter 10 to detect an extinction ratio thereof. The extinction ratio detector 160 can detect the extinction ratio easily as compared to the unit 150, shown in FIG. 30.

As described above, in the optical transmission system according to the seventeenth preferred embodiment, the extinction ratio, which is one parameter of calculation in the simulator 15, is monitored via the interface unit (SV) 14a. In accordance with the calculation result of the simulator 15, other parameters influencing deterioration of the transmission quality can be controlled to minimize an bit-error rate or to maximize a Q-factor to obtain the maximum system margin.

Eighteenth Preferred Embodiment

Figure 32:
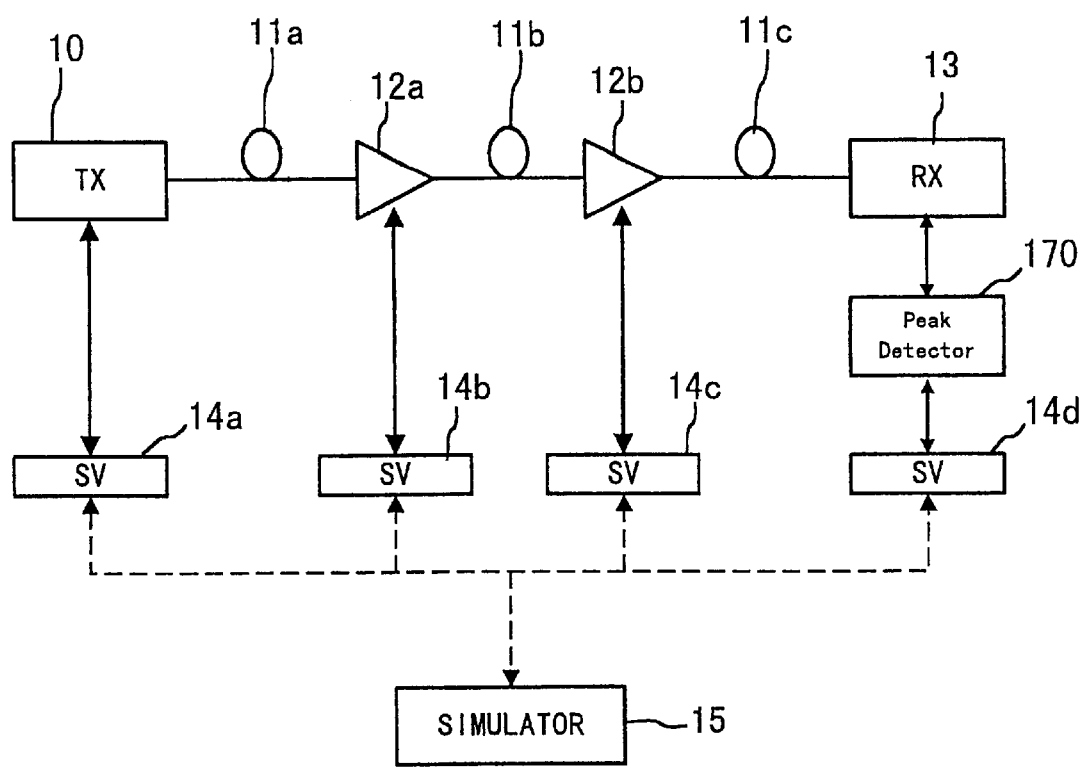
FIG. 32 is a block diagram showing the structure of an optical transmission system and a method for supervising the same, according to an eighteenth preferred embodiment of the invention.

FIG. 32 shows the structure of an optical transmission system using an optical transmission simulator, according to an eighteenth preferred embodiment of the invention. In this preferred embodiment, the same or corresponding components to the first preferred embodiment, shown in FIG. 1, are indicated by the same reference numerals and symbols.

This preferred embodiment is formed by modifying the above mentioned optical transmission system of the first preferred embodiment, shown in FIG. 1. In this preferred embodiment, a peak of a light signal received by an optical receiver is detected and monitored.

In FIG. 32, the optical transmission system includes an optical transmitter (TX) 10, optical fibers 11a, 11b and 11c, repeaters 12a and 12b, an optical receiver (RX) 13, interface units 14a, 14b, 14c and 14d, an optical simulator 15 and a peak detector 170. Each of the repeaters 12a and 12b is equipped with an optical amplifier, which amplifies a light signal. The optical fiber 11a connects the optical transmitter 10 and the repeater 12a. The optical fiber 11b connects repeaters 12a and 12b. The optical fiber 11c connects the repeater 12b and the optical receiver 13.

The interface units 14a, 14b, 14c and 14d are connected to the optical transmitter 10, the repeater 12a, the repeater 12b and the optical receiver 13, respectively. Each of the interface units (SV) 14a, 14b, 14c and 14d monitors and controls each device connected thereto. The simulator 15 is connected to the interface units 14a, 14b, 14c and 14d with a communication line, such as a telephone line, a supervisory network, etc. The simulator 15 simulates the operation of the system based on information from the interface units (SV) 14a, 14b, 14c and 14d.

The optical transmitter (TX) 10 converts an electric signal into a light signal having a specific wavelength, and transmits it to the repeater 12a via the optical fiber 11a. The peak detector 170 detects a peak of a signal light received by the optical receiver 13. The peak detector 170 supplies its output signal to the interface unit (SV) 14d.

Figure 33:
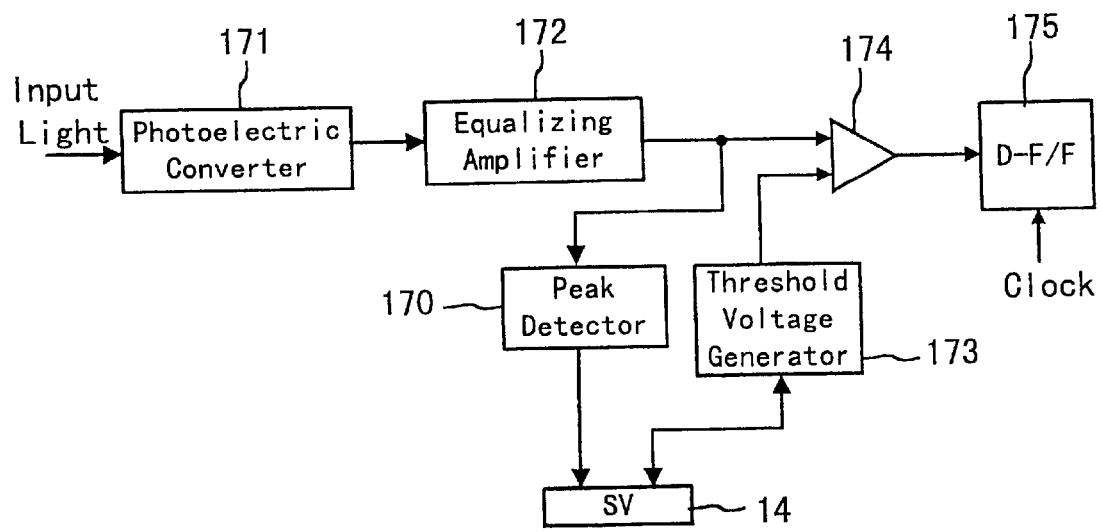
FIG. 33 is a block diagram showing the detailed structure of an optical receiving device, including a received waveform peak detector, in the optical transmission system and the method for supervising the same, according to the seventeenth preferred embodiment.

FIG. 33 is a block diagram illustrating the detailed structure of the above-mentioned peak detector 170. In FIG. 33, the peak detector 170 includes a photoelectric (O/E) converter 171; an equalizing amplifier 172; a threshold voltage generator 173; a level discriminator 174; and a D flip-flop (D-FE). The photoelectric converter 171 is connected to the equalizing amplifier 172, which is connected to the peak detector 170. The level discriminator 174 is connected at input terminals to the equalizing amplifier 172 and the threshold voltage generator 173, and at an output terminal to the D flip-flop 175. The peak detector 170 and the threshold voltage generator 173 are connected to the interface unit 14d.

The photoelectric (O/E) converter 171 converts an input light signal into an electric signal. The equalizing amplifier 172 includes an AGC (Automatic Gain Control), which equally amplifies the electric signal, supplied from the photoelectric converter 171. The threshold voltage generator 173 generates a threshold voltage to be supplied to the level discriminator 174 for level detection. The level discriminator 174 compares the equally amplified signal and the threshold voltage to perform level discrimination. The D flip-flop (D-FF) 175 timing-discriminates the level-discriminated data in accordance with a sampling clock.

The equalizing amplifier 172 supplies an output signal to the interface unit (SV) 14d via the peak detector 170. The threshold voltage generator 173 supplies a threshold voltage to both the level discriminator 174 and the interface unit (SV) 14d.

Next, the above-described optical transmission system and a method for supervising the same will be described. An input light signal supplied to the optical receiver 13 is converted into an electric signal by the photoelectric converter 171, and the electric signal is amplified by the equalizing amplifier 172 to have a predetermined amplitude. The equally amplified signal is compared to the threshold voltage supplied from the threshold voltage generator 173, and is discriminated high or low relative to the threshold voltage. The discriminated signal is reproduced by the D-FF 175 using the sampling clock.

The equally amplified signal is also supplied to the peak detector 170 so that the high level (VH) and low level (VL) of the signal are detected as its peaks to be supplied to the interface unit (SV) 14d. The threshold voltage (VTH), which is generated by the threshold voltage generator 173 and supplied to the level discriminator 174, is transferred to the interface unit (SV) 14d.

For performing the optimum control of the transmission system using the threshold voltage (VTH), calculated by the simulator 15, it is required to know a high level (VH) and a low level (VL) of the received signal. According to this embodiment, the threshold voltage VTH is controlled in response to variation of the high level (VH) and the low level (VL), so that the optical transmission system can be controlled precisely.

For instance, in the simulator 15, the threshold voltage VTH0 may be calculated by performing normalization with the parameters VH, VL, VTH. The normalizing calculation is carried out in accordance with the following equation (3):

$$VTH0=(VL-VTH)/(VH-VL) \tag{3}$$

As described above, according to the eighteenth preferred embodiment, the optical receiver 13 is provided with the peak detector 170, which detects the peak of a received waveform. The peak detector 170 detects a high level (VH) and a low level (VL) of the received signal, and those levels are monitored together with the threshold voltage VTH0 by the simulator 15 via the interface unit 14d. As a result, the simulator 15 can control the threshold voltage VTH to have the optimum value, and therefore, the transmission system can have the maximum system margin.

Nineteenth Preferred Embodiment

Figure 34:
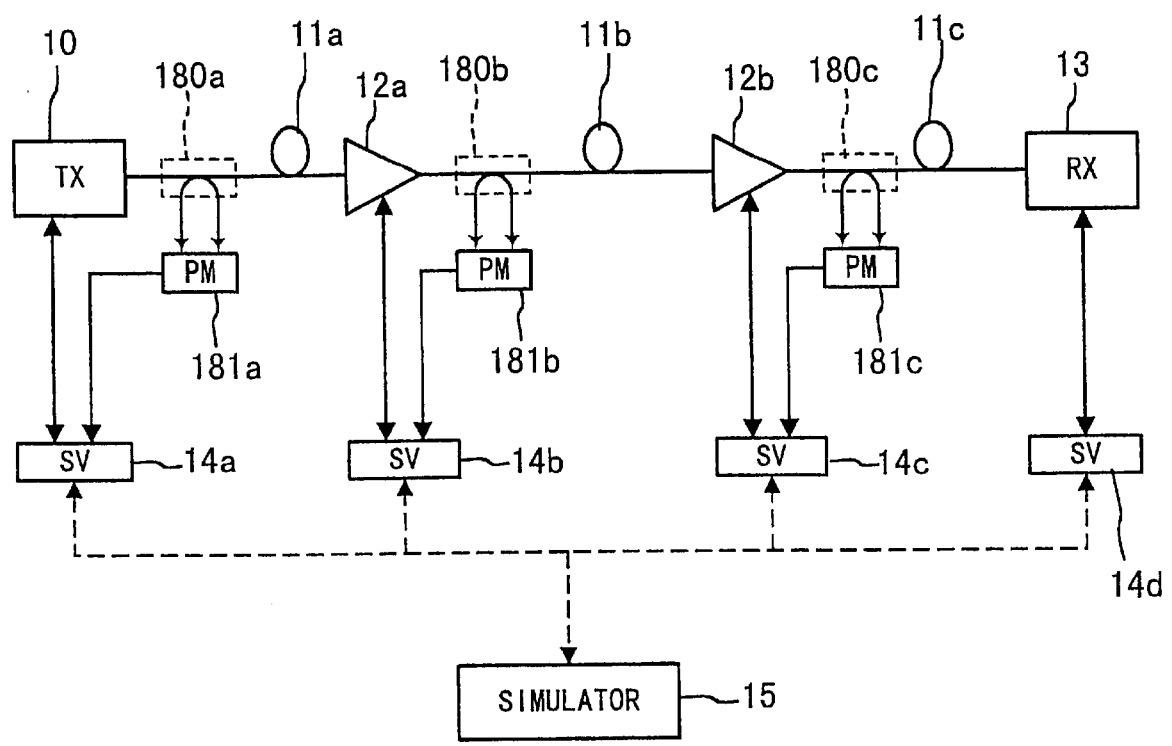
FIG. 34 is a block diagram showing the structure of an optical transmission system and a method for supervising the same, according to a nineteenth preferred embodiment of the invention.

FIG. 34 is a diagram showing the structure of an optical transmission system using an optical transmission simulator, according to a nineteenth preferred embodiment of the invention. In this preferred embodiment, the same or corresponding components to the first preferred embodiment, shown in FIG. 1, are indicated by the same symbols.

To the first preferred embodiment shown in FIG. 1, this preferred embodiment is formed by adding a function for detecting and monitoring a non-linear phenomenon SBS (Stimulated Brillouin Scattering) in a transmission line.

In FIG. 34, the optical transmission system includes an optical transmitter (TX) 10, optical fibers 11a, 11b and 11c, repeaters 12a and 12b, an optical receiver (RX) 13, interface units 14a, 14b, 14c and 14d, an optical simulator 15, optical couplers 180a, 180b and 180c and optical power monitors 181a, 181b and 181b.

The optical transmitter (TX) 10 converts an electric signal into a light signal having a specific wavelength, and transmits it to the repeater 12a via the optical fiber 11a. Each of the repeaters 12a and 12b is equipped with an optical amplifier, which amplifies a light signal. The optical fiber 11a connects the optical transmitter 10 to the repeater 12a through the optical coupler 180a. The optical fiber 11b connects repeaters 12a and 12b through the optical coupler 180b. The optical fiber 11c connects the repeater 12b to the optical receiver 13 through the optical coupler 180c.

The interface unit 14a is connected to the optical transmitter 10 and the optical power monitor 181a, which is connected to the optical coupler 180a. The interface unit 14b is connected to the repeater 12a and the optical power monitor 181b, which is connected to the optical coupler 180b. The interface unit 14c is connected to the repeater 12b and the optical power monitor 181c, which is connected to the optical coupler 180c. The interface unit 14d is connected to the optical receiver 13.

Each of the interface units (SV) 14a, 14b, 14c and 14d monitors and controls each device connected thereto. The simulator 15 is connected to the interface units 14a, 14b, 14c and 14d with a communication line, such as a telephone line, a supervisory network, etc. The simulator 15 simulates the operation of the system based on information from the interface units (SV) 14a, 14b, 14c and 14d.

The optical coupler 180a, which is arranged at the input end of the optical fiber 11a, divides a light signal transmitted from the optical transmitter 10. The optical power monitor 181a monitors power of input/output light traveling through the optical fiber 11a. The optical coupler 180b, which is arranged at the input end of the optical fiber 11b, divides a light signal transmitted from the repeater 12a. The optical power monitor 181b monitors power of input/output light traveling through the optical fiber 11b. The optical coupler 180c, which is arranged at the input end of the optical fiber 11c, divides a light signal transmitted from the repeater 12b. The optical power monitor 181c monitors power of input/output light traveling through the optical fiber 11c.

Each pair of the optical coupler (180a, 180b and 180c) and the optical power monitor (181a, 181b and 181c) form a monitor device as a whole, which monitors an input light power at the input end of the optical fiber (11a, 11b and 11c) and a light power returned through the optical fiber (11a, 11b and 11c). Each of the optical power monitors 181a, 181b and 181c supplies the detected light level to the simulator 15 via the interface unit (14a, 14b, 14c and 14d).

Figure 35:
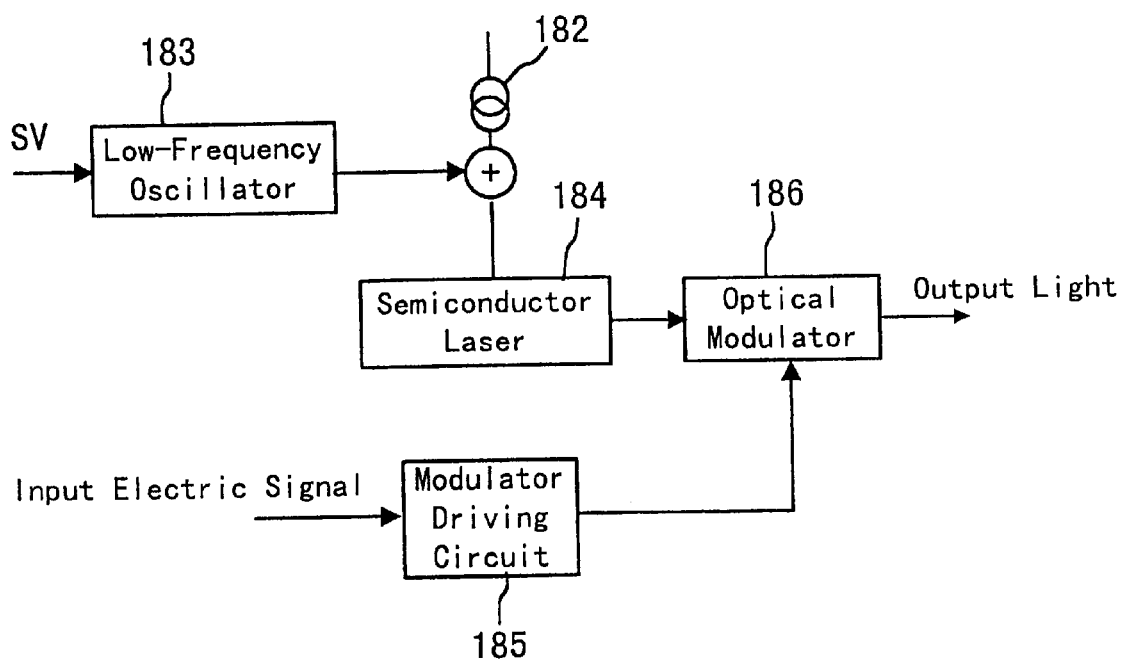
FIG. 35 is a block diagram showing the detailed structure of an SBS monitor for a transmission line fiber and an optical transmitter controlling the SBS in the optical transmission system and the method for supervising the same, according to the nineteenth preferred embodiment.

FIG. 35 is a block diagram showing the detailed structure of the optical transmitter 10, in which an SBS (Stimulated Brillouin Scattering) in the transmission line is monitored and controlled. In FIG. 35, the optical transmitter 10 includes a bias current source 182, a low frequency oscillator 183, a semiconductor laser 184, an optical modulator 186 and an optical modulator driving circuit 185.

The bias current source 182 supplies bias current to the semiconductor laser 184. The low frequency oscillator 183 is used for current modulation. The semiconductor laser 184 outputs a light signal. The optical modulator driving circuit 185 drives the optical modulator 186 in response to an input electric signal. The optical modulator 186 modulates the light signal supplied from the semiconductor laser 184. An output level of the low frequency oscillator 183 is controlled via the interface unit (SV) 14a by an output circuit.

In general, as known in the conventional optical transmitter described in "Study Group of Optical Communication System OCS91-49, Electric Information Communication Society CS96-43," when the input power of an optical fiber is increased over a specific level, a backscattering light is increased in power in response to the non-linear phenomenon (SBS: Stimulated Brillouin Scattering). When the backscattering light is increased in the optical fiber, the output light of the optical fiber is saturated.

Accordingly, in this embodiment, the SBS is monitored at the input end of each optical fiber (11a, 11b and 11c) and a spectrum width of the light source 184 is increased by current modulation. As a result, the input power level in which the backscattering light starts increasing, which is a so-called SBS threshold value, is improved.

In the optical transmitter 10, the output level of the low frequency oscillator 183 can be controlled by an output circuit. As a degree of the current modulation is controllable, the spectrum width of the light source 184 is controllable as well. The current modulation can be carried out with a voltage source, besides the current source.

The output light of the semiconductor laser 184 is supplied to the optical modulator 186, and is modulated by the optical modulator 186, driven by the optical modulator driving circuit 185.

The simulator 15 monitors the input light and the backscattering light of each optical fiber via the interface units 14a, 14b, 14c and 14d, using the optical couplers 180a, 180b and 180c, and the optical power monitor 181a, 181b and 181c. The simulator 15 controls the light source 184 to have a spectrum width that does not cause any of the optical fibers 11a, 11b and 11c to have the SBS.

As described above, the optical transmission system, according to the nineteenth preferred embodiment, the spectrum width of the light source 184 is controlled by an output circuit. As a result, the spectrum width of the light source 184 can be controlled while monitoring the SBS at the input end of each optical fiber (11a, 11b and 11c), and therefore, the transmission system operates under a stable condition without SBS.

Twentieth Preferred Embodiment

Figure 36:
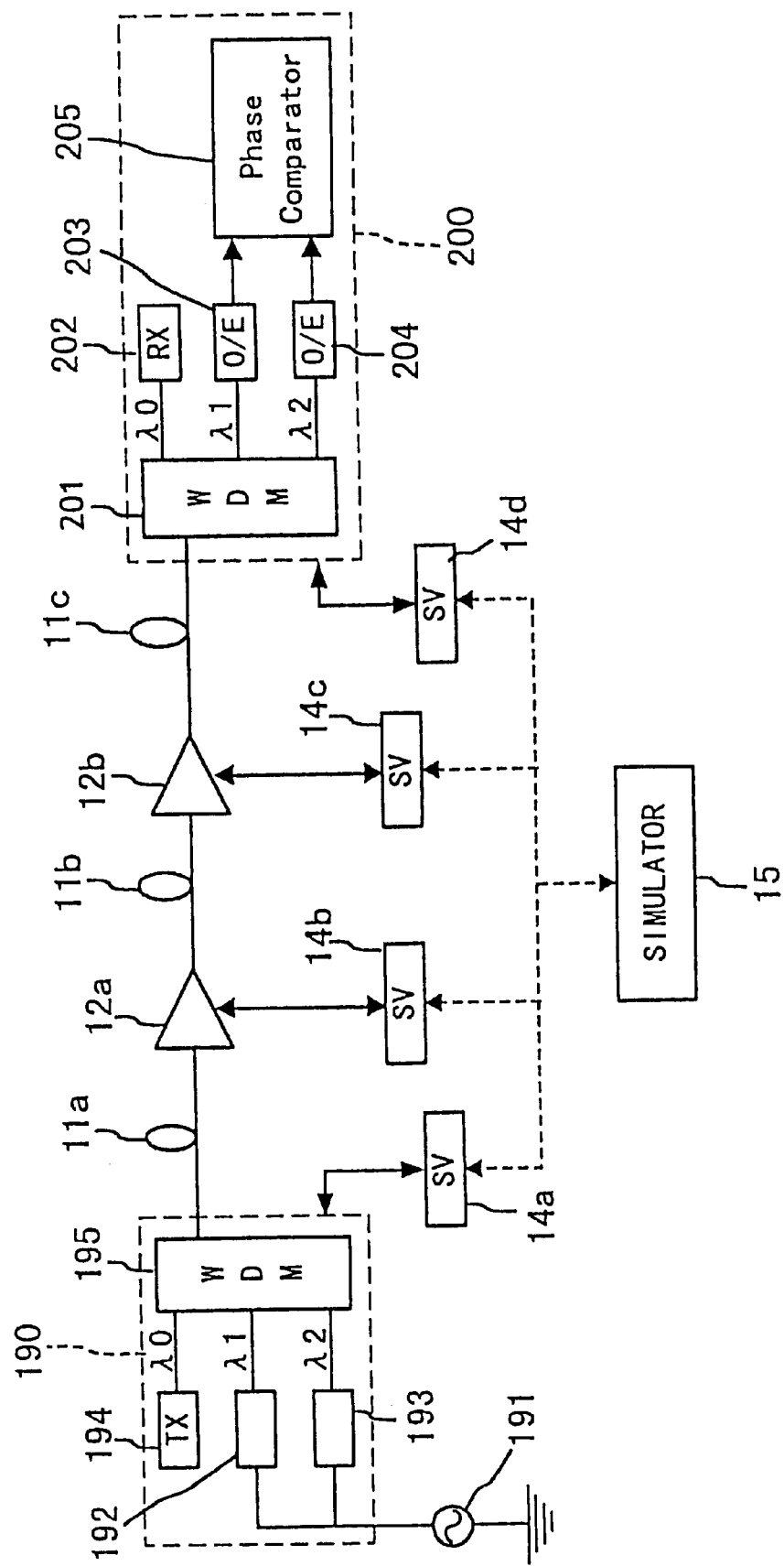
FIG. 36 is a block diagram showing the structure of an optical transmission system and a method for supervising the same, according to a twentieth preferred embodiment of the invention.

FIG. 36 shows the structure of an optical transmission system using an optical transmission simulator, according to a twentieth preferred embodiment of the invention. In this preferred embodiment, the same or corresponding components to the first preferred embodiment, shown in FIG. 1, are indicated by the same reference numerals and symbols.

To the first preferred embodiment shown in FIG. 1, this embodiment is established by adding a function for monitoring wavelength dispersion of a transmission line.

In FIG. 36, the optical transmission system includes an optical transmitter unit 190, optical fibers 11a, 11b and 11c, repeaters 12a and 12b, an optical receiver unit 200, interface units 14a, 14b, 14c and 14d and an optical simulator 15.

The optical transmitter unit 190 converts an electric signal into a light signal having a specific wavelength, and transmits it to the repeater 12a via the optical fiber 11a. Each of the repeaters 12a and 12b is equipped with an optical amplifier, which amplifies a light signal. The optical fiber 11a connects the optical transmitter 190 to the repeater 12a. The optical fiber 11b connects repeaters 12a and 12b through the optical coupler 180b. The optical fiber 11c connects the repeater 12b to the optical receiver unit 200 through the optical coupler 180c.

The interface units 14a, 14b, 14c and 14d are connected to the optical transmitter unit 190, the repeater 12a, the repeater 12b and the optical receiver unit 200, respectively. Each of the interface units (SV) 14a, 14b, 14c and 14d monitors and controls each device connected thereto. The simulator 15 is connected to the interface units 14a, 14b, 14c and 14d with a communication line, such as a telephone line, a supervisory network, etc. The simulator 15 simulates the operation of the system based on information from the interface units (SV) 14a, 14b, 14c and 14d.

The optical transmitter unit 190 includes an oscillator 191, a wavelength variable light source 192 (wavelength $\lambda 1$), a reference light source 193 (wavelength $\lambda 2$), an optical transmitter (TX) 194 (wavelength $\lambda 0$) and a transmitter side WDM 195. The oscillator 191 is connected to the wavelength variable source 192 and the reference light source 193. The WDM 195 is connected to each of the frequency variable light source 192, the reference light source 193 and the optical transmitter 194. The WDM 195 wavelength-multiplexes the three light signals, supplied from the devices 192, 193 and 194, having the different wavelengths of $\lambda 0$, $\lambda 1$ and $\lambda 2$ to generate a single light to be transmitted to the optical fiber 11a.

The optical receiver unit 200 includes a receiver side WDM 201; an optical receiver 202; a first light receiving element 203; a second light receiving element 204; and a phase comparator 205. The WDM 201 is connected to each of the optical receiver 202, the first light-receiving element 203 and the second light-receiving element 204. The first and second light receiving elements 203 and 204 are connected to the phase comparator 205.

The WDM 201 divides a received signal into three signals having the wavelengths of $\lambda 0$, $\lambda 1$ and $\lambda 2$. The optical receiver 202 receives the $\lambda 0$ component of light. The first light receiving element 203 receives the $\lambda 1$ component of light and converts it into an electric signal. The second light receiving element 204 receives the $\lambda 2$ component of light and converts it into an electric signal. The phase comparator 205 detects the phase difference between the lights supplied from the first and second light receiving elements 203 and 204.

In the optical transmitter unit 190, the wavelength variable light source 192 and the reference light source 193 perform modulating process in accordance with signals from the oscillator 191. In the optical receiver unit 200, the receiver side WDM 201 divides a received signal into three signals having the wavelengths of λ0, λ1 and λ2, and supplies the divided λ0, λ1 and λ2 components to the optical receiver 202, the first light receiving element 203 and the second light receiving element 204, respectively. The signals received by the first and second light receiving elements 203 and 204 are supplied to the phase comparator 205, which detects the phase difference between those two signals.

The phase difference between the λ1 and λ2 components is detected in the optical receiver unit 200, while the simulator 15 changes the output wavelength of the wavelength variable light source 192 in the optical transmitter unit 190. If a similar transmission line is employed in the system, the WDMs can be omitted to perform the same operation.

Then, data for wavelength dependency of the phase difference is transferred via the interface unit (SV) 14d to the simulator 15.

Figure 37:
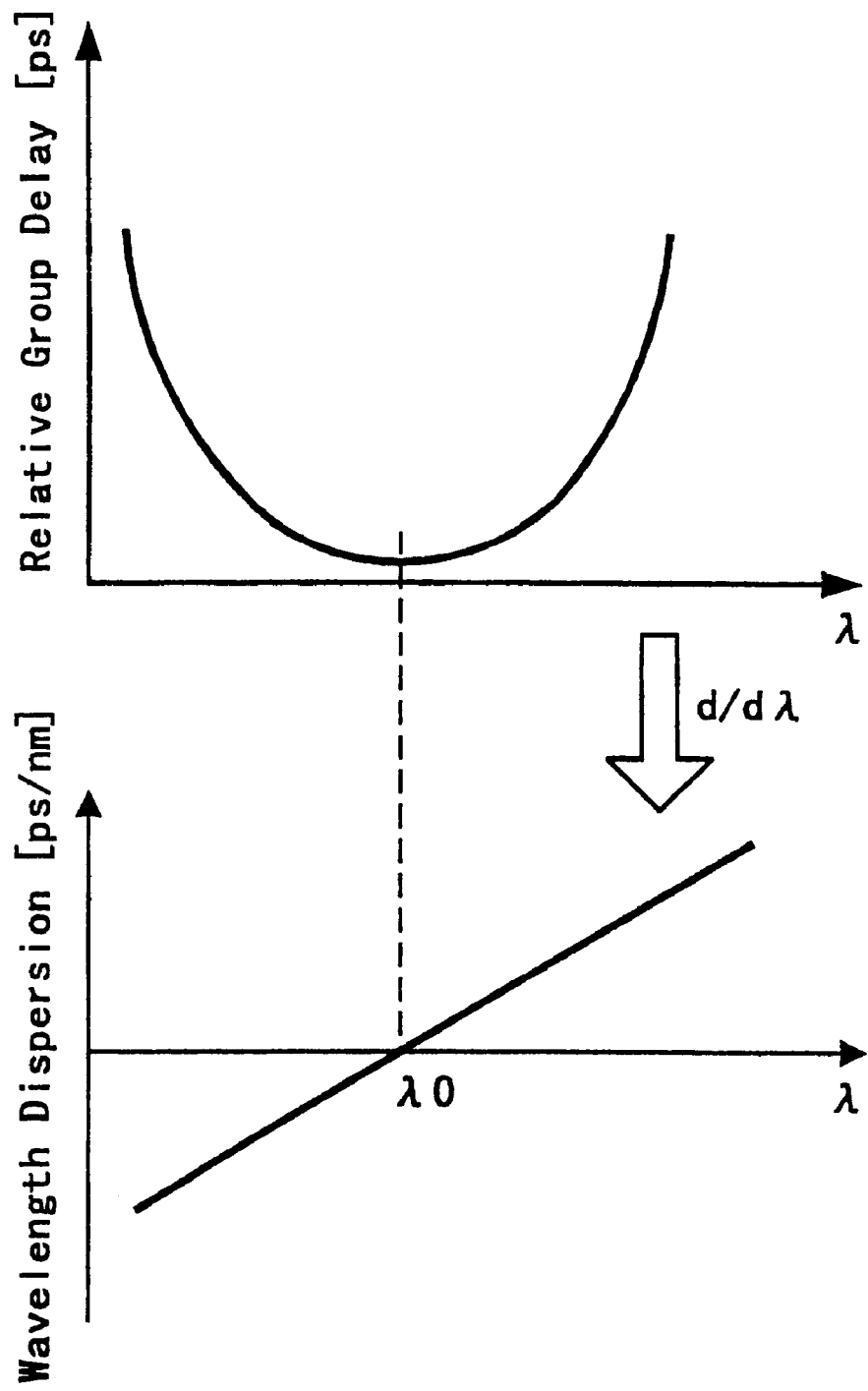
FIG. 37 is a graph used for explaining the measurement theory of wavelength dispersion in an optical fiber, in the optical transmission system and the method for supervising the same, according to the twentieth preferred embodiment.

FIG. 37 shows the relation between a relative group delay and a wavelength dispersion, which is used for explaining the theory for measuring wavelength dispersion of the optical fibers. In FIG. 37, the phase difference between the λ1 component and the λ2 component corresponds to the relative group delay of the optical fiber. In general as the wavelength dispersion of an optical fiber can be calculated based on the wavelength differential of the relative group delay, the wavelength dispersion of each wavelength can be obtained by differentiating the phase difference data with the wavelength. Such wavelength dispersion data may be easily detected by a detector, for example "83567A" by HP.

As described above, in the optical transmission system according to the twentieth preferred embodiment, the simulator 15 calculates the wavelength dispersion of the transmission line (11a, 11b and 11c) based on the detected phase difference. The simulator 15 optimizes each parameter based on the wavelength dispersion, and controls each device via the interface units (SV) 14a, 14b, 14c and 14d based on the optimized parameters so that the transmission system has the minimum bit-error rate or the maximum Q-factor.

In more detail the dependency of the relative group delay on the wavelength is actually measured for the reference light source and the variable wavelength light source, then the simulator 15 calculates the wavelength dispersion of the transmission line (11a, 11b and 11c) based on the measured value. In accordance with the wavelength dispersion of the transmission line, the simulator 15 calculates a bit-error rate and a Q-factor of the system. In addition, the simulator 15 calculates the optimum value for each parameter, and then controls each device via the interface unit (SV) 14 so that the bit-error rate has the minimum value or the Q-factor has the maximum value to obtain the maximum system margin.

The optical transmission system and the method for supervising the same, having the above-described advantages, may be applied to an optical subscriber network system to obtain the maximum system margin. Preferably, the invention is applied to a system that needs additional optical amplifiers in response to, for instance, a demand for increasing the transmission capacity.

Each embodiment is applicable to a basic trunk transmission system, a subscriber network system, etc. However, the invention is, of course, applicable to any kinds of device equipped with a system for transmitting a light signal.

It is clear that none of the embodiments limit the type, number and connection way of the optical amplifiers, optical couplers, filters, WDMs and each detector; the kind of parameters for each device; and the way of simulation.

According to the invention, predetermined estimation parameters are monitored from each device to estimate (calculate) a bit-error rate or Q-factor. Then, the simulator calculates the optimum control values so as to minimize the bit-error rate or to maximize the Q-factor, and controls each device in accordance with the optimum control values. As a result, the optical transmission system has the maximum system margin. Therefore, even if some devices operate out of their margin, the transmission system still operates in a range of its system margin as a whole. Consequently, it is not always required to establish an auxiliary line in addition to the main transmission line.

It will be understood that the above description of the present invention is susceptible to various modifications, changes and adaptations, and the same are intended to be comprehended with the meaning and range of equivalents of the appended claims.

What is claimed is:

1. A signal transmission system, comprising:
    a transmitter operable to transmit a signal;
    a receiver operable to receive the signal;
    a transmission line connecting said transmitter and said receiver;
    a first device coupled to said transmission line;
    an interface unit operable to monitor an operating condition of the signal transmission system; and
    a simulator operable to simulate transmission quality of the signal transmission system in response to the operating condition, and to control at least one of said transmitter, said receiver and said first device so as to optimize the transmission quality.

2. A signal transmission system according to claim 1, wherein said transmission line comprises an optical fiber and the signal comprises a signal light.

3. A signal transmission system according to claim 2, wherein the operating condition depending on said transmitter is represented by a parameter comprising at least one of a false random signal number (bit number); a transmission speed, a wavelength of the signal light, a wavelength chirp level, an extinction ratio, and a SN ratio.

4. A signal transmission system according to claim 2, wherein the operating condition depending on said optical fiber is represented by a parameter comprising at least one of a first-order dispersion and a second order dispersion for each wavelength, a non-linear constant, a fiber length, a propagation loss and an input light power.

5. A signal transmission system according to claim 2, wherein the operating condition depending on said receiver is represented a parameter including at least one of an O/E conversion factor, a receiving bandwidth (electric), a peak value of a received waveform and a Q-factor.

6. A signal transmission system according to claim 2, further comprising an optical amplifier operable to amplify the signal light transmitted from said transmitter via said optical fiber, wherein said interface unit is operable to monitor an operating condition depending on said optical amplifier, the operating condition being represented by a parameter comprising at least one of a signal gain, a noise figure, and an input/output light power.

7. A signal transmission system according to claim 2, wherein said transmitter, receiver and said transmission line are operable for a plurality of signal lights, and said simulator is operable to supervise said transmission line, said transmitter and said receiver such that said transmitter and said receiver provide optimum conditions for each wavelength of the plurality of signal lights.

8. A signal transmission system according to claim 7, further comprising means for changing parameters of said transmitter and said receiver automatically when a wavelength channel is changed, wherein said interface unit and said simulator operate based on the changed parameters.

9. A signal transmission system according to claim 8, wherein said means for changing parameters comprises means for changing parameters of said transmitter and said receiver automatically without influencing other wavelength channels when a current wavelength channel is out of order.

10. A signal transmission system according to claim 7, further comprises a wavelength detector operable to detect a wavelength of each of the plurality of signal lights, wherein said simulator is operable to calculate an optimum wavelength that creates no four-way-mixing in simulation and to control said transmitter and said receiver based on said optimum wavelength.

11. A signal transmission system according to claim 2, further comprising a dispersion compensator operable to compensate for a wavelength dispersion of said optical fiber, wherein said simulator is operable to control said dispersion compensator to have an optimum compensating rate via said interface unit.

12. A signal transmission system according to claim 2, wherein said transmitter comprises a chirp parameter controller operable to control a wavelength chirp parameter of the signal light to be transmitted to said transmission line.

13. A signal transmission system according to claim 12, wherein said transmitter further comprises a first semiconductor laser, and said chirp parameter controller comprises:
   a second semiconductor laser, an optical modulator, operable to modulate a light supplied from said second semiconductor laser, and a modulator driving circuit operable to supply a drive signal to said optical modulator, said simulator being operable to control said modulator driving circuit via said interface unit in response to a dispersion of said optical fiber so as to optimize a waveform of the signal light.

14. A signal transmission system according to claim 2, further comprising an extinction ratio detector operable to detect an extinction ratio of the signal light supplied by said transmitter, wherein said simulator is operable to monitor the extinction ratio via said interface unit and to control at least one of said transmitter, said receiver and said first device to optimize transmission quality.

15. A signal transmission system according to claim 14, wherein said extinction ratio detector comprises:
   a sampling oscilloscope operable to sample the signal light at predetermined intervals and to convert the sampled signals into electric signals; and
   a processor operable to calculate an extinction ratio of the signal light based on the electric signals supplied by said sampling oscilloscope.

16. A signal transmission system according to claim 14, wherein said extinction ratio detector comprises:
   a photoelectric converter operable to convert the signal light into an electric signal; and
   a peak detector operable to detect a peak value of the signal light based on the electric signal supplied by said photoelectric convertor.

17. A signal transmission system according to claim 2, further comprising a power monitor operable to monitor both power of the signal light at an input end of said optical fiber and power of a light returned from said optical fiber, wherein said simulator is operable to control a spectrum width of the signal light to be supplied from said transmitter in response to the two monitored powers so as to prevent stimulated Brillouin scattering.

18. A signal transmission system according to claim 2, further comprising a dispersion detector operable to detect a wavelength dispersion of said optical fiber, wherein said simulator is operable to control at least one of said transmitter, said receiver and said first device via said interface unit in response to the wavelength dispersion supplied from said dispersion detector.

19. A signal transmission system according to claim 18, further comprising:
   an optical transmitter unit, comprising:
      said transmitter operable to transmit a first light having a first wavelength,
      a frequency-variable light source operable to supply a second light having a second wavelength,
      a reference light source operable to supply a third light having a third wavelength, and
      a wavelength-division-multiplexer operable to multiplex the first, second and third lights to generate the signal light; and
   an optical receiver unit, comprising:
      a wavelength-division-multiplexer operable to divide the signal light supplied from said optical transmitter unit into the first, second and third lights,
      said receiver operable to receive the first light,
      a first optical receiving element operable to convert the second light into a second electrical signal,
      a second optical receiving element operable to convert the third light into a third electric signal, and
      a phase comparator operable to compare the first and second electric signals to determine a phase difference between them, wherein said simulator is operable to calculate the wavelength dispersion from the phase difference between the first and second electric signals and to control at least one of said transmitter, said receiver and said first device in response to the phase difference to optimize transmission quality of said signal transmission system.

20. A signal transmission system according to claim 1, wherein the transmission quality comprises at least one of a bit-error rate, Q-factor, and a condition that does not create a four-mixing-wave.

21. A signal transmission system according to claim 1, further comprising supervisory lines connecting, at least one of said transmitter, receiver and said first device to said interface unit and said interface unit to said simulator, wherein said interface unit is operable to collect the operating condition via said supervisory lines and said simulator is operable to control at least one of said transmitter, said receiver and said first device via said supervisory lines.

22. A signal transmission system according to claim 1, wherein said interface unit comprises an interface unit for each of said transmitter and said receiver, and said simulator comprises a simulator for each of said transmitter and said receiver.

23. A signal transmission system according to claim 1, wherein said interface unit comprises an interface unit for each of said transmitter and said receiver, and said simulator comprises a simulator for each of said transmitter and said receiver, each of said simulators being operable to independently supervise said transmitter and said receiver, respectively.

24. A signal transmission system according to claim 1, wherein said transmission line comprises an upward line and a downward line, said interface unit is operable to collect the operating conditions through said upward and downward lines, and said simulator is operable to control at least one of said transmitter, said receiver and said first device through said upward and downward lines.

25. A signal transmission system according to claim 1, wherein said transmission line is of a two-way transmission type and is operable to allow different wavelengths of signals to be transmitted, said interface unit is operable to collect the operating condition through said transmission line, and said simulator is operable to control at least one of said transmitter, said receiver and said first device through said transmission line.

26. A signal transmission system according to claim 1, wherein said transmitter comprises a plurality of transmitters, said transmission line comprises a plurality of transmission lines, and said receiver comprises a plurality of receivers, and said simulator is operable to select an optimum combination of said plurality of transmitters, transmission lines and receivers to establish a transmission circuit which optimizes transmission quality.

27. A signal transmission system according to claim 1, further comprising:
    a frequency discriminator operable to supply an output signal that is changed in response to frequency variation of the signal; and
    a peak detector operable to detect a peak value of the output signal of said frequency discriminator, wherein said simulator is operable to calculate a chirp parameter based on the peak value supplied from said peak detector via said interface unit and to control at least one of said transmitter, said receiver and said first device based on the chirp parameter so as to optimize transmission quality.

28. A signal transmission system according to claim 1, further comprising a peak detector operable to detect peak values from the signal received by said receiver, wherein said simulator is operable to control a threshold value of said receiver in response to the peak values supplied by said peak detector via said interface unit.

29. A signal transmission system according to claim 28, further comprising:
    an equalizing amplifier operable to amplify the signal received by said receiver;
    a threshold voltage generator operable to generate a threshold voltage; and
    a level discriminator operable to discriminate the signal supplied from said equalizing amplifier based on the threshold voltage, wherein said peak detector is operable to detect the peak values based on the signal supplied from said equalizing amplifier and said simulator is operable to control said threshold voltage generator so as to generate an optimum threshold voltage.

30. A signal transmission system, comprising:
    an optical transmitter operable to transmit a signal light;
    an optical receiver operable to receive the signal light transmitted from said optical transmitter;
    a repeater connected between said optical transmitter and said optical receiver;
    optical fibers connecting said optical transmitter to said repeater and said repeater to said optical receiver, respectively;
    interface units operable to detect predetermined estimation parameters from said optical transmitter, said repeater, and said optical receiver; and
    a simulator operable to simulate transmission quality of said optical transmitter, said repeater, said optical fibers, and said optical receiver in response to the predetermined estimation parameters supplied from said interface units and further operable to control at least one of said optical transmitter, said repeater, and said optical receiver so as to minimize a bit-rate error or to maximize a Q-factor.

31. A method of supervising an optical transmission system comprising:
    transmitting a signal light from an optical transmitter through an optical fiber;
    amplifying the signal light transmitted from the optical transmitter with a repeater;
    receiving the signal light transmitted through the optical fiber via the repeater with an optical receiver and generating an output signal;
    detecting predetermined estimation parameters from the optical transmitter, the repeater, and the optical receiver with interface units;
    simulating transmission quality of the optical transmission system in response to the predetermined estimation parameters supplied by the interface units; and
    controlling at least one of the optical transmitter, the repeater, and the optical receiver via the interface units so as to minimize a bit-error rate or to maximize a Q-factor.

* * * * *